Aug. 23, 1938.　　　C. W. GREEN　　　2,127,684
CASH REGISTER
Original Filed March 27, 1931　16 Sheets-Sheet 1

Inventor
Charles W. Green
By
Carl Berust
His Attorney

Aug. 23, 1938.  C. W. GREEN  2,127,684
CASH REGISTER
Original Filed March 27, 1931   16 Sheets-Sheet 3

Inventor
Charles W. Green
By
His Attorney

Aug. 23, 1938.   C. W. GREEN   2,127,684
CASH REGISTER
Original Filed March 27, 1931   16 Sheets-Sheet 4

Inventor
Charles W. Green
By Carl Benst
His Attorney

Aug. 23, 1938.  C. W. GREEN  2,127,684
CASH REGISTER
Original Filed March 27, 1931   16 Sheets—Sheet 5
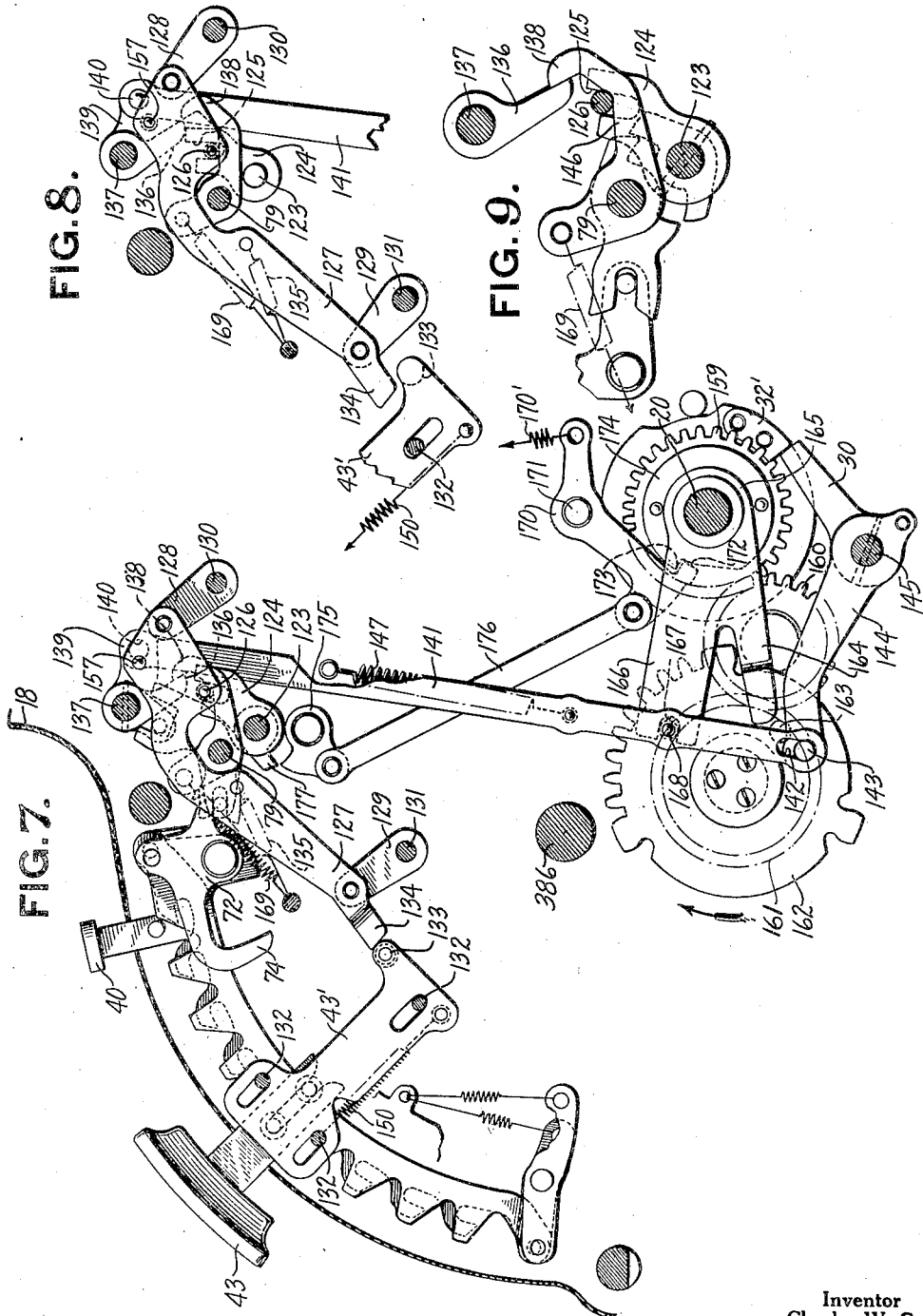
Inventor
Charles W. Green
By
Earl Benst
His Attorney

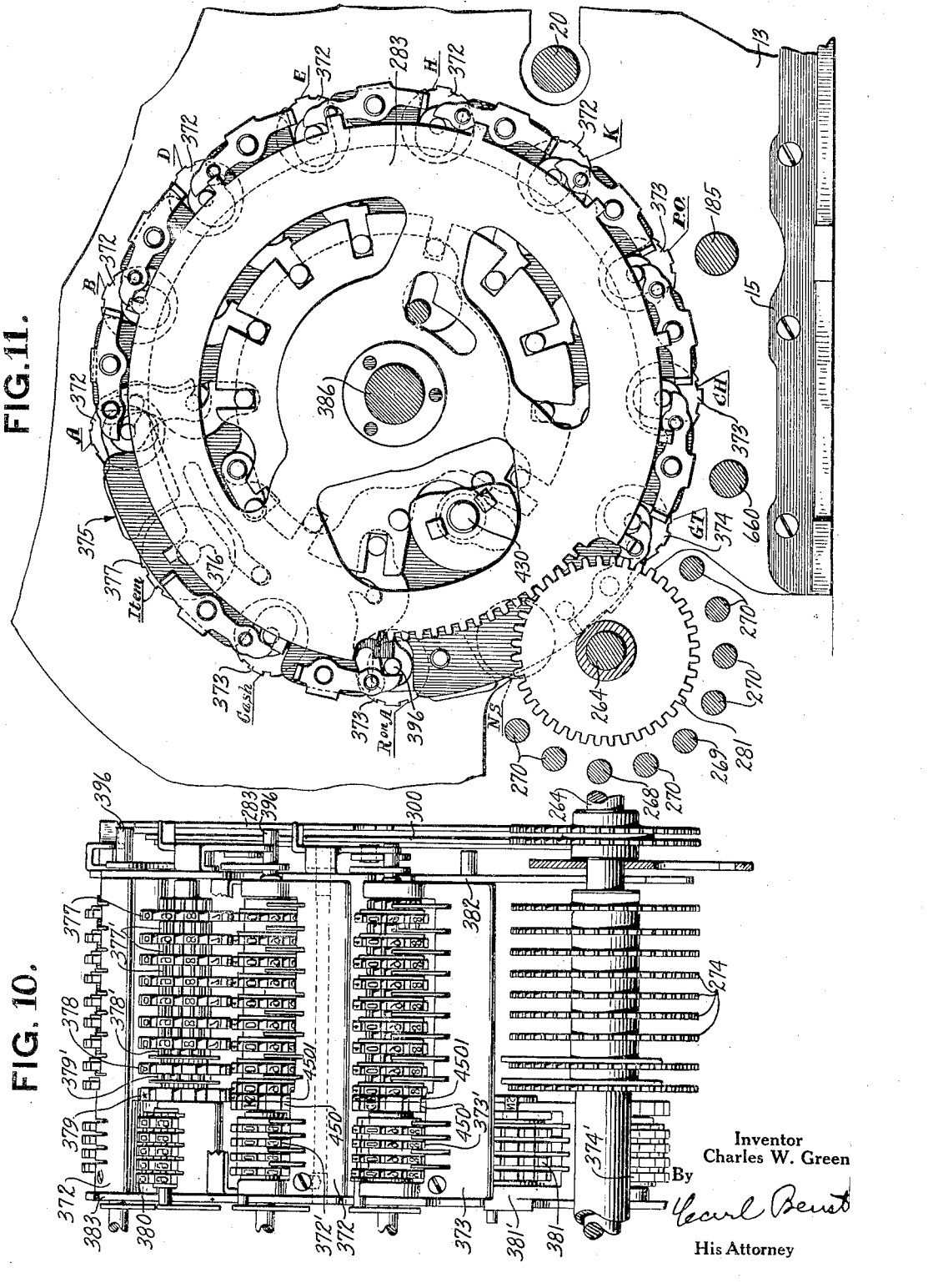

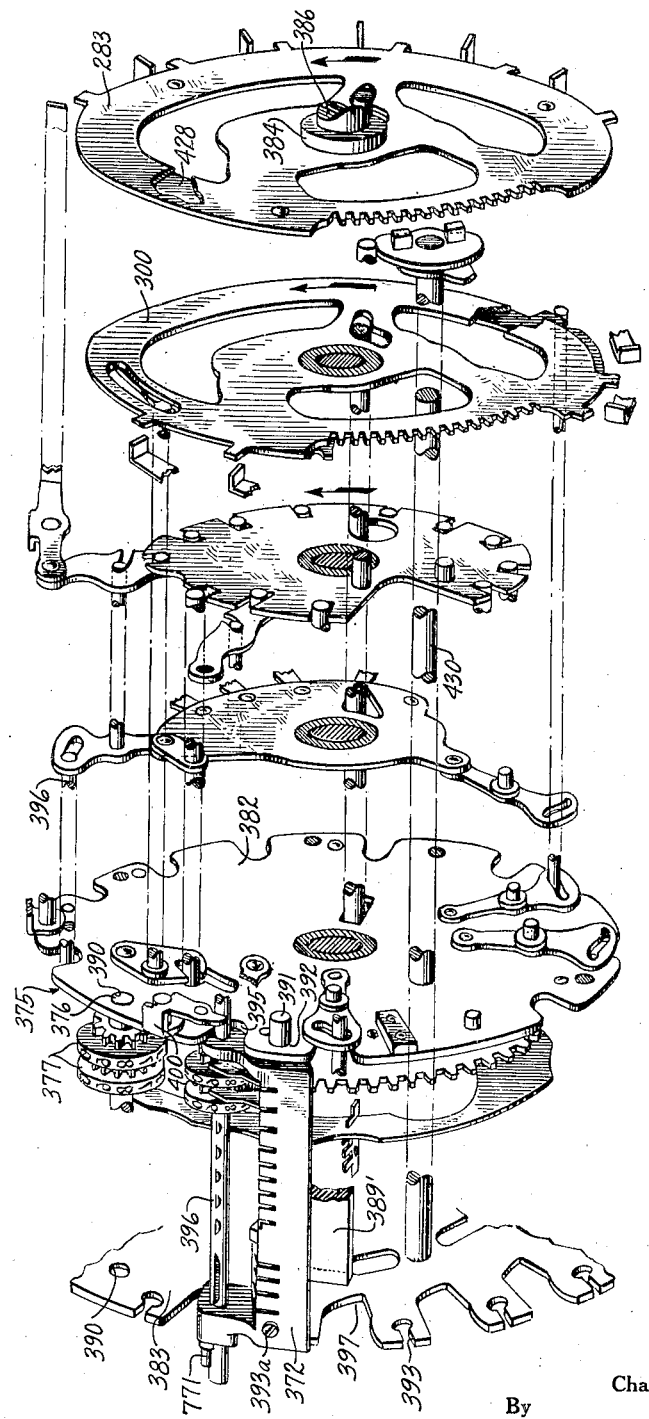

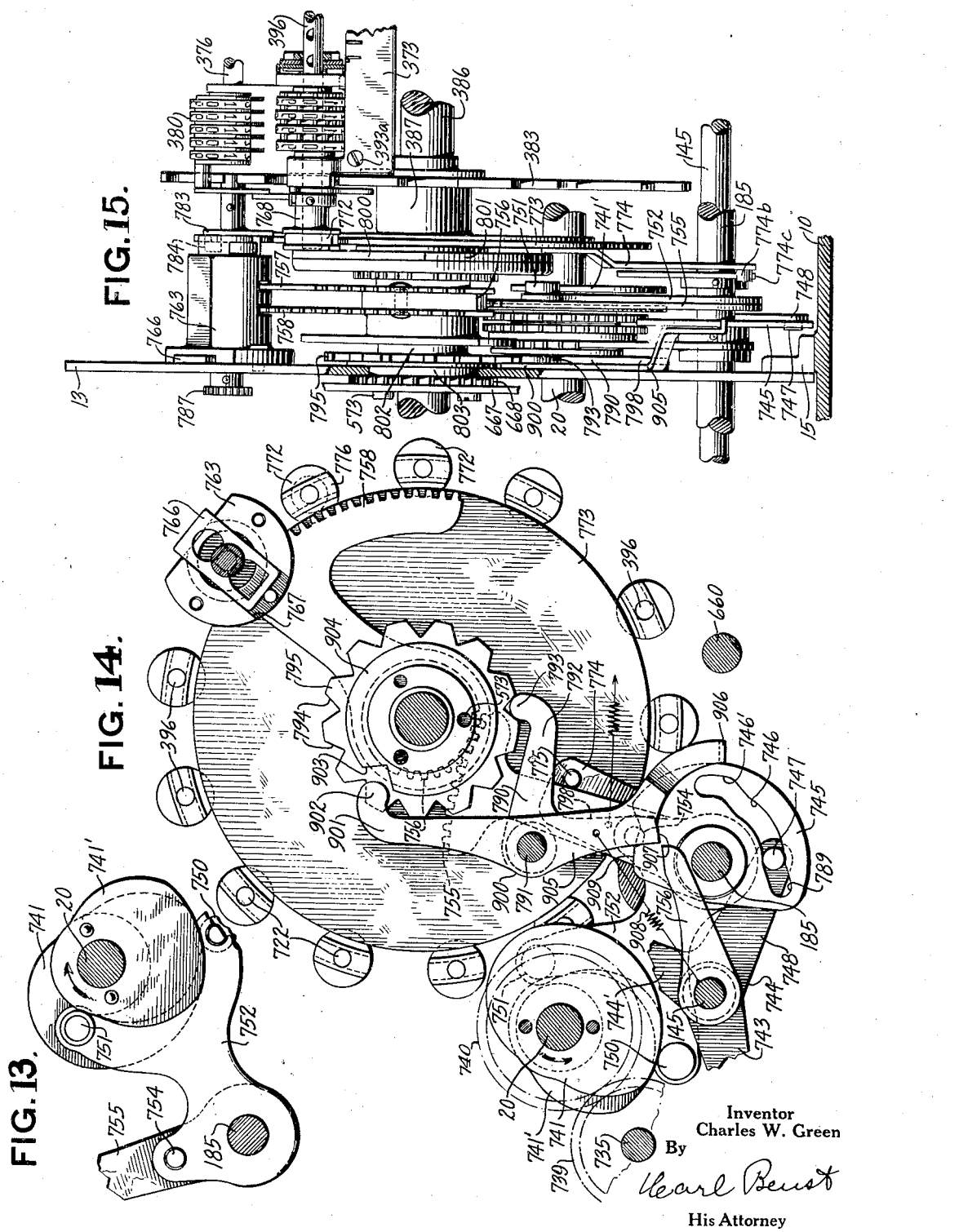

Aug. 23, 1938.  C. W. GREEN  2,127,684
CASH REGISTER
Original Filed March 27, 1931   16 Sheets-Sheet 9
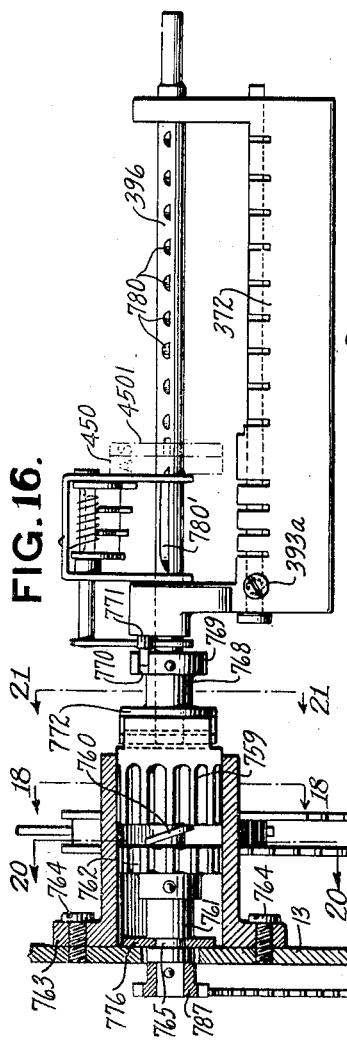
Inventor
Charles W. Green
By
His Attorney Aug. 23, 1938.  C. W. GREEN  2,127,684
CASH REGISTER
Original Filed March 27, 1931   16 Sheets-Sheet 10
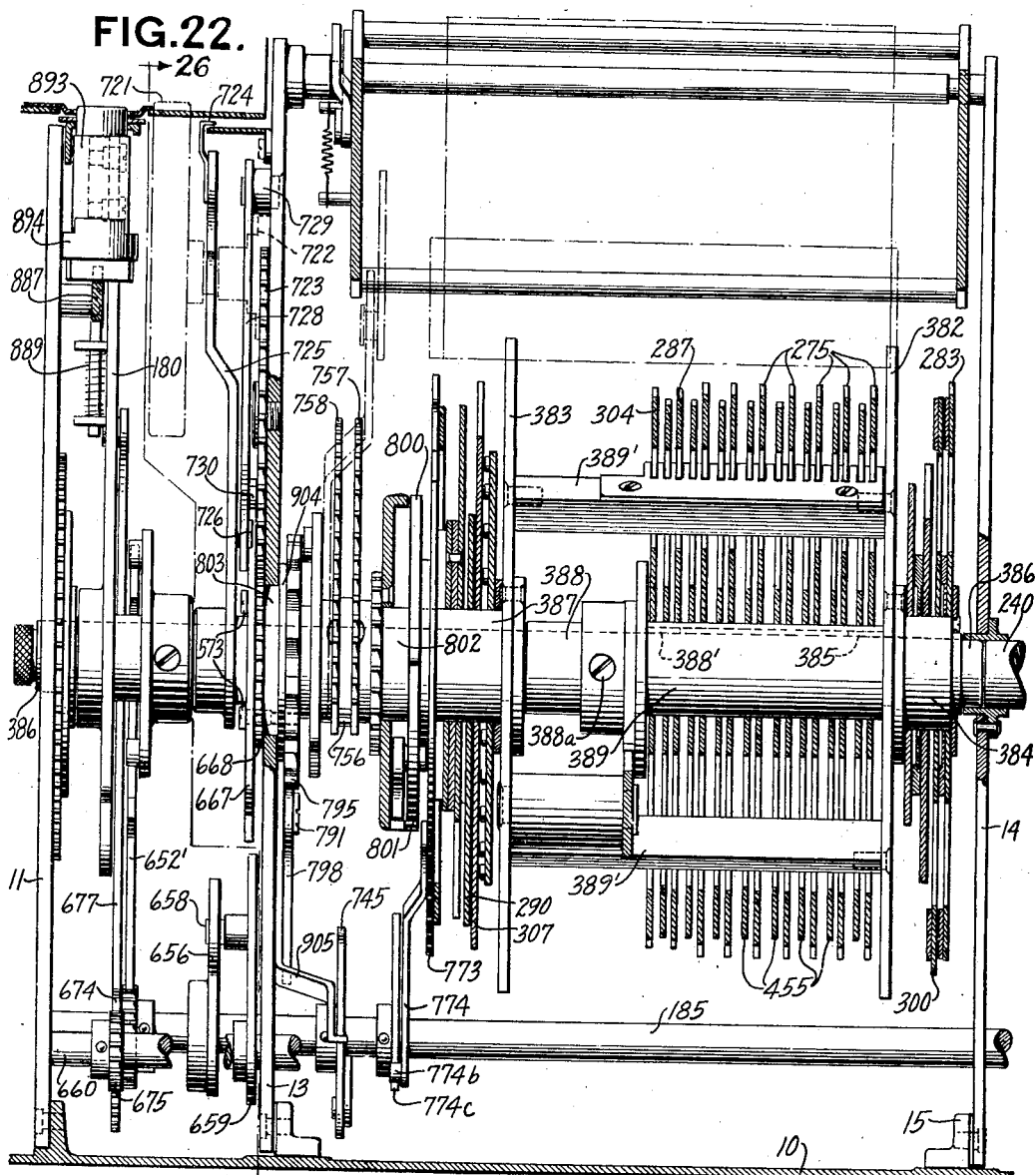
FIG.22.
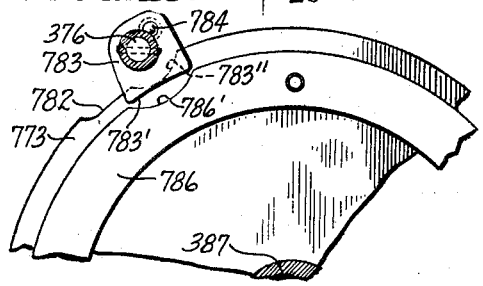
FIG.23.
FIG.24.
Inventor
Charles W. Green
By
*Pearl Bernt*
His Attorney Aug. 23, 1938.  C. W. GREEN  2,127,684
CASH REGISTER
Original Filed March 27, 1931   16 Sheets-Sheet 11
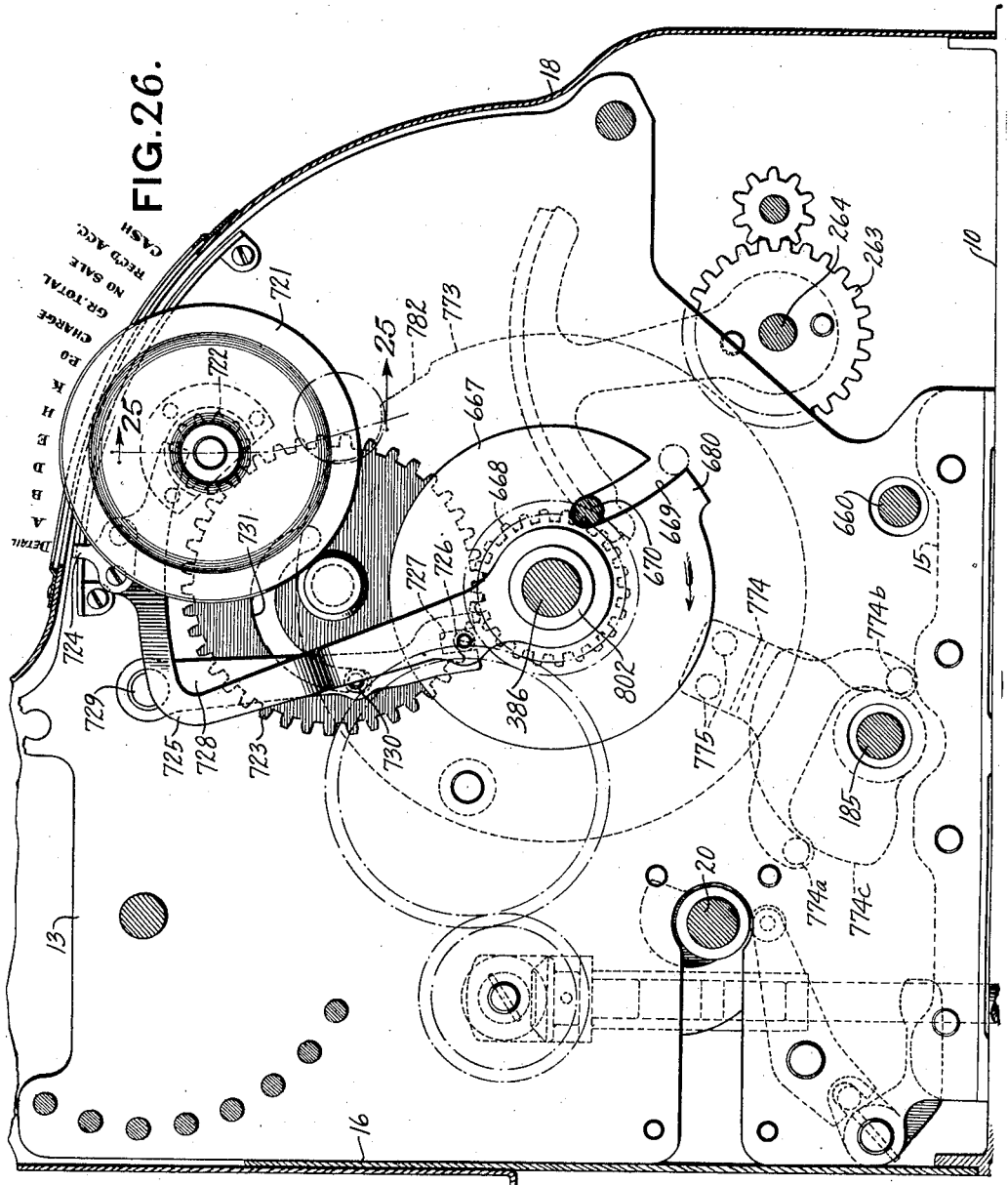
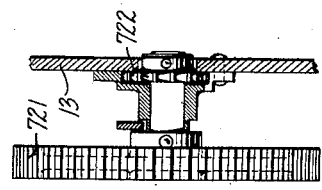
Inventor
Charles W. Green
By
His Attorney

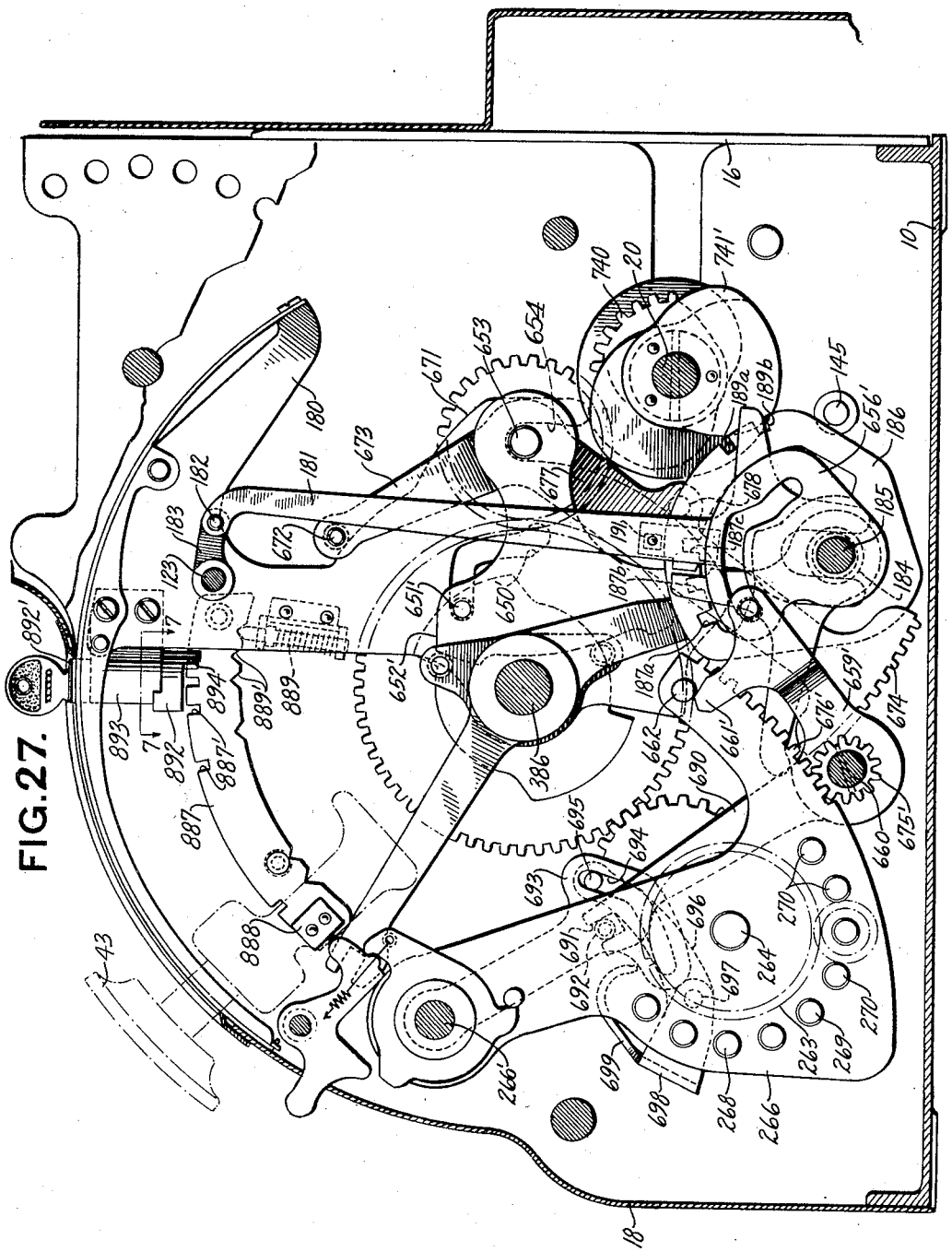

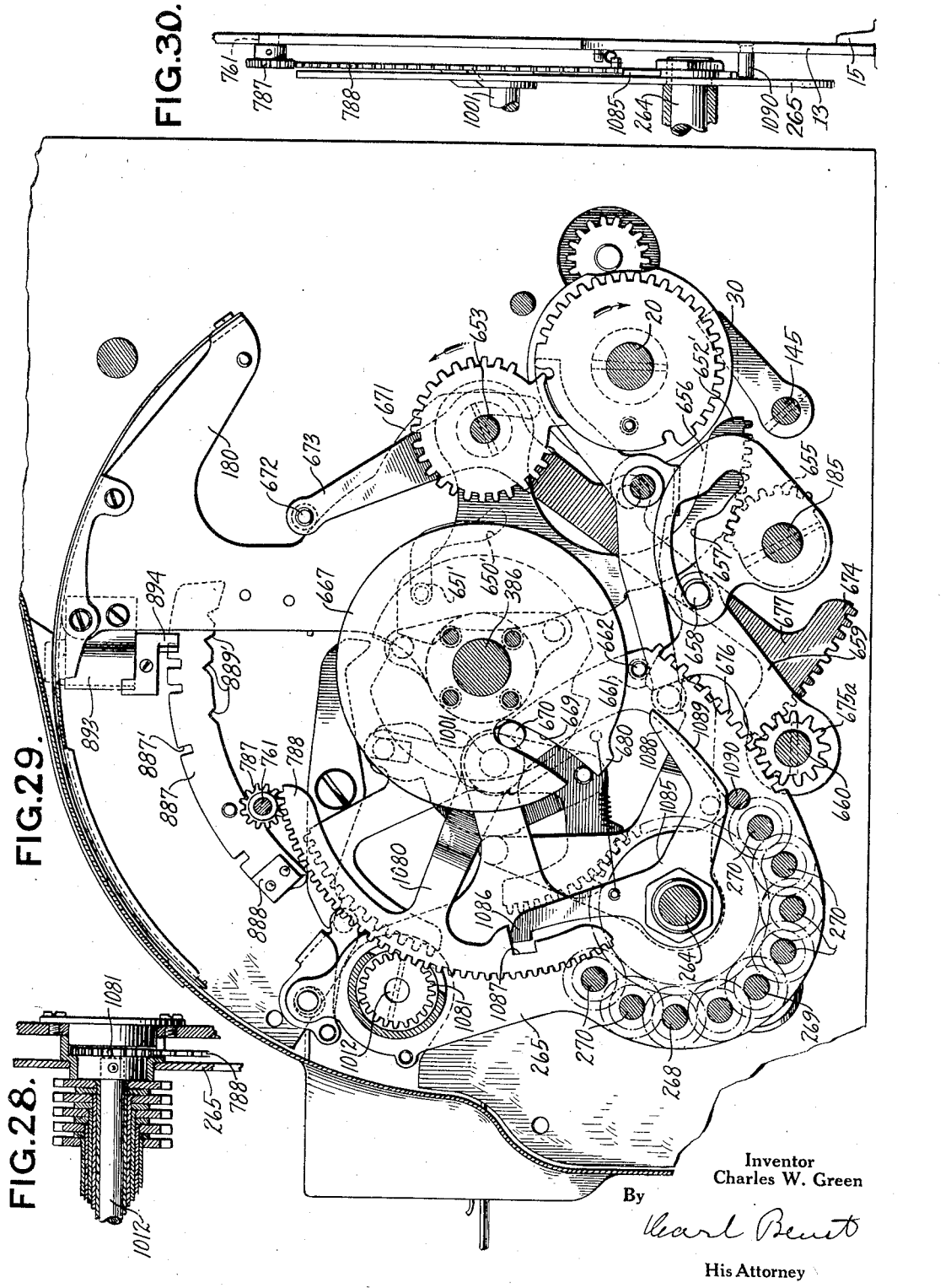

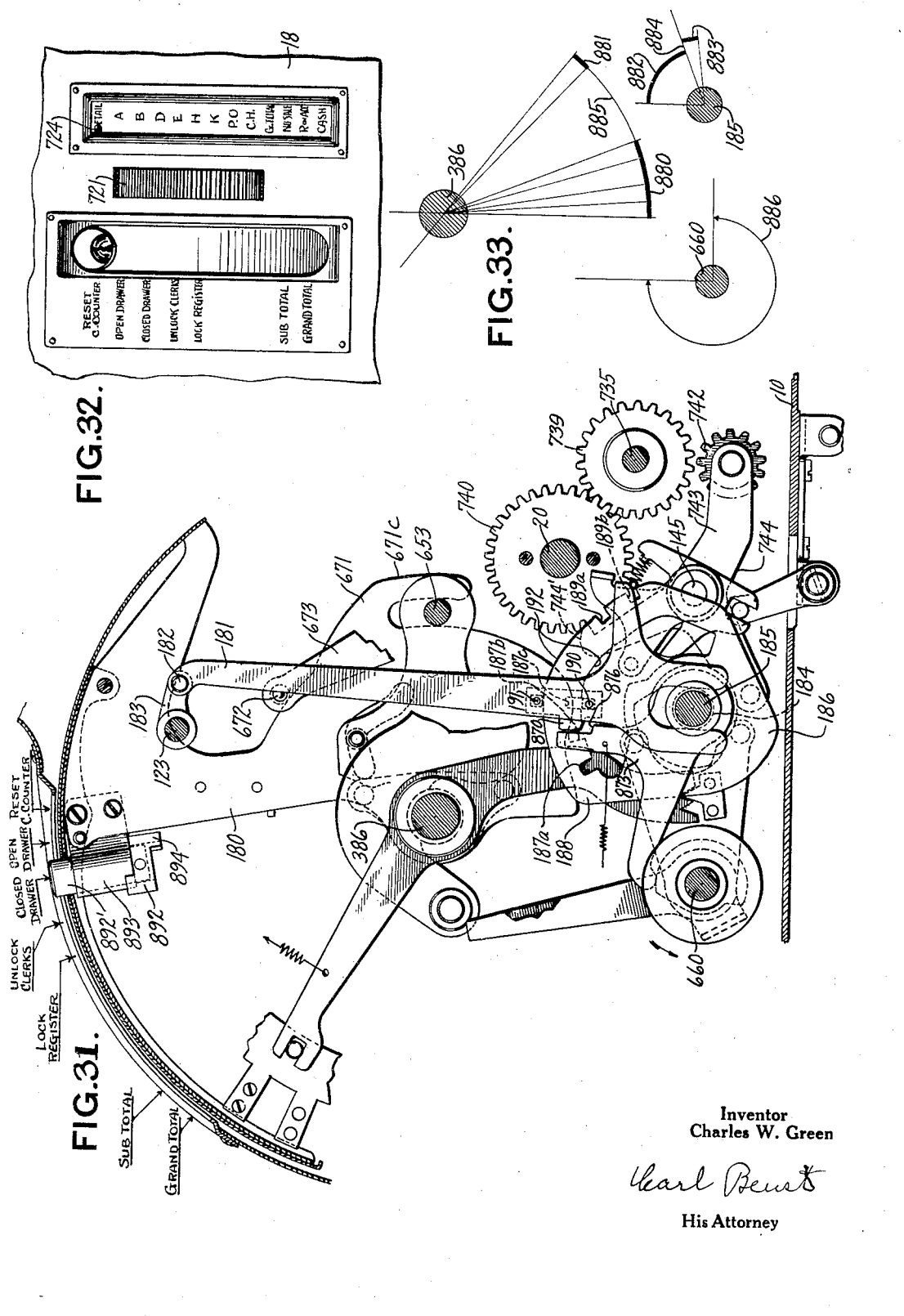

Aug. 23, 1938.　　　　C. W. GREEN　　　　2,127,684
CASH REGISTER
Original Filed March 27, 1931　　16 Sheets-Sheet 15

Inventor
Charles W. Green
By
*Carl Bem*
His Attorney

Aug. 23, 1938.  C. W. GREEN  2,127,684
CASH REGISTER
Original Filed March 27, 1931  16 Sheets-Sheet 16

Inventor
Charles W. Green
By
Carl Benst
His Attorney

Patented Aug. 23, 1938

2,127,684

UNITED STATES PATENT OFFICE 2,127,684

CASH REGISTER

Charles W. Green, Dayton, Ohio, assignor to The National Cash Register Company, Dayton, Ohio, a corporation of Maryland Original application March 27, 1931, Serial No. 525,630. Divided and this application April 22, 1936, Serial No. 75,666

12 Claims. (Cl. 235—144)

This invention relates to cash registers and analogous devices, and particularly to that type having a plurality of totalizers, some of which are provided for separately registering the totals of the various transactions entered in the machine by the individual clerks, while others are provided for separately registering the totals of the different kinds of transactions entered in the machine; and is a division of the application for United States Letters Patent of Charles W. Green, Serial No. 525,630, filed March 27, 1931, which issued as Patent No. 2,063,091 on December 8, 1936.

Another object of this invention is the provision of means for successively selecting the totalizers to have the totals printed therefrom and at the same time to have the totalizers reset to their zero positions.

Another object of the present invention is to provide a plurality of special counters and novel resetting mechanism associated therewith, whereby these special counters may be reset to zero simultaneously with the resetting of the totalizers with which they are respectively associated.

Another important object of the present invention is to provide the plurality of printing totalizers and special counters above mentioned with a special mounting means in the form of a reel, and also to provide therein a series of item type carriers, so that each item entered in the machine may be printed upon a record strip as well as the total standing on each of the totalizers and special counters. This reel is so constructed that for item entering operations of the machine the various totalizers and special counters may be selected for operation while the reel is stationary. Printing from the totalizers and special counters is effected by first releasing the reel and then rotating the same to bring each totalizer and counter successively to the printing line. After the totals have been printed from the several totalizers, they are reset to zero by the novel mechanism of this machine.

A further object of the present invention is so provide a unitary control mechanism for controlling the various kinds of operations which the machine is adapted to perform.

A further object of this invention is to provide a single lock control mechanism with two keys, by which a limited numbers of operations of the machine may be controlled when unlocked by one key, while said control mechanism, when unlocked by the other key, may be made to control all of the operations of the machine, the latter particularly controlling the unlocking of the mechanism whereby the totalizers may be reset to zero along with the resetting of the special counters.

With these and incidental objects in view, the invention consists in certain novel features and constructions of parts, the essential elements of which are set forth in the appended claims, and a preferred form or embodiment of which is hereinafter described with reference to the drawings which accompany and form part of this specification.

Of said drawings:

Fig. 7 is a general view of the motor release bar and all of the parts associated therewith for controlling the release of the machine and also shows the means for restoring the parts to normal during an operation of the machine.

Fig. 8 is a view showing the position of the parts immediately after the motor release bar has been depressed.

Fig. 9 is a detail view showing some of the locking elements for the operating mechanism in their normal positions.

Fig. 10 is a front elevational view of the totalizer reel.

Fig. 11 is a view of the totalizer reel taken on line 11—11 of Fig. 2.

Fig. 12 is an extended perspective view of the totalizer reel.

Fig. 13 is a detail view of the cams for operating the resetting mechanism.

Fig. 14 is a view taken on line 14—14 of Fig. 2 showing particularly the resetting mechanism, and the interlocks between the totalizer reel and the motor control shaft.

Fig. 15 is a front view of the resetting mechanism showing certain of the mechanisms associated therewith.

Fig. 16 is a general view of the resetting mechanism with parts drawn in section to show the gearing for shifting and rotating the totalizer shaft.

Fig. 17 is a detail view of a totalizer wheel showing the pawl carried thereby and a notched portion of the totalizer shaft with which this pawl cooperates during a resetting operation.

Fig. 18 is a sectional view taken on line 18—18 of Fig. 16.

Fig. 19 is a sectional view taken substantially on line 19—19 of Fig. 18.

Fig. 20 is a sectional view taken on line 20—20 of Fig. 16.

Fig. 21 is a view taken on line 21—21 of Fig. 16.

Fig. 22 is an elevational view taken substantially through the mid-portion of the totalizer reel, showing the relative positions of the various control mechanisms for the machine.

Fig. 23 is a fragmentary end view showing a portion of the means for controlling the resetting of one of the consecutive number or special counters.

Fig. 24 is a side view of the mechanism shown in Fig. 23.

Fig. 25 is a detail view of the manual means for rotating the reel to select a totalizer for total printing and resetting.

Fig. 26 is a sectional view taken substantially on line 26—26 of Fig. 22 showing particularly the mechanism for rotating the totalizer reel.

Fig. 27 is a general elevational view of the control mechanism and its associated parts.

Fig. 28 is a fragmentary view showing the arrangement of the nested sleeves associated with the check and slip type wheels, and also certain connections associated with the means for resetting the consecutive number or special counter for the check and slip printer.

Fig. 29 is a sectional view taken on line 29—29 of Fig. 2.

Fig. 30 is a fragmentary view showing connections provided for resetting the consecutive number or special counter associated with the check and slip printer.

Fig. 31 is a general elevational view of the control mechanism, showing particularly the associated release mechanism for the machine and the series of interlocks controlled by the control mechanism.

Fig. 32 is a view of the legend plates associated with the control lever and reel operating means.

Fig. 33 is a diagrammatical view illustrating the relative movements of the control shafts during the movement of the control lever.

GENERAL DESCRIPTION

Figure 1:
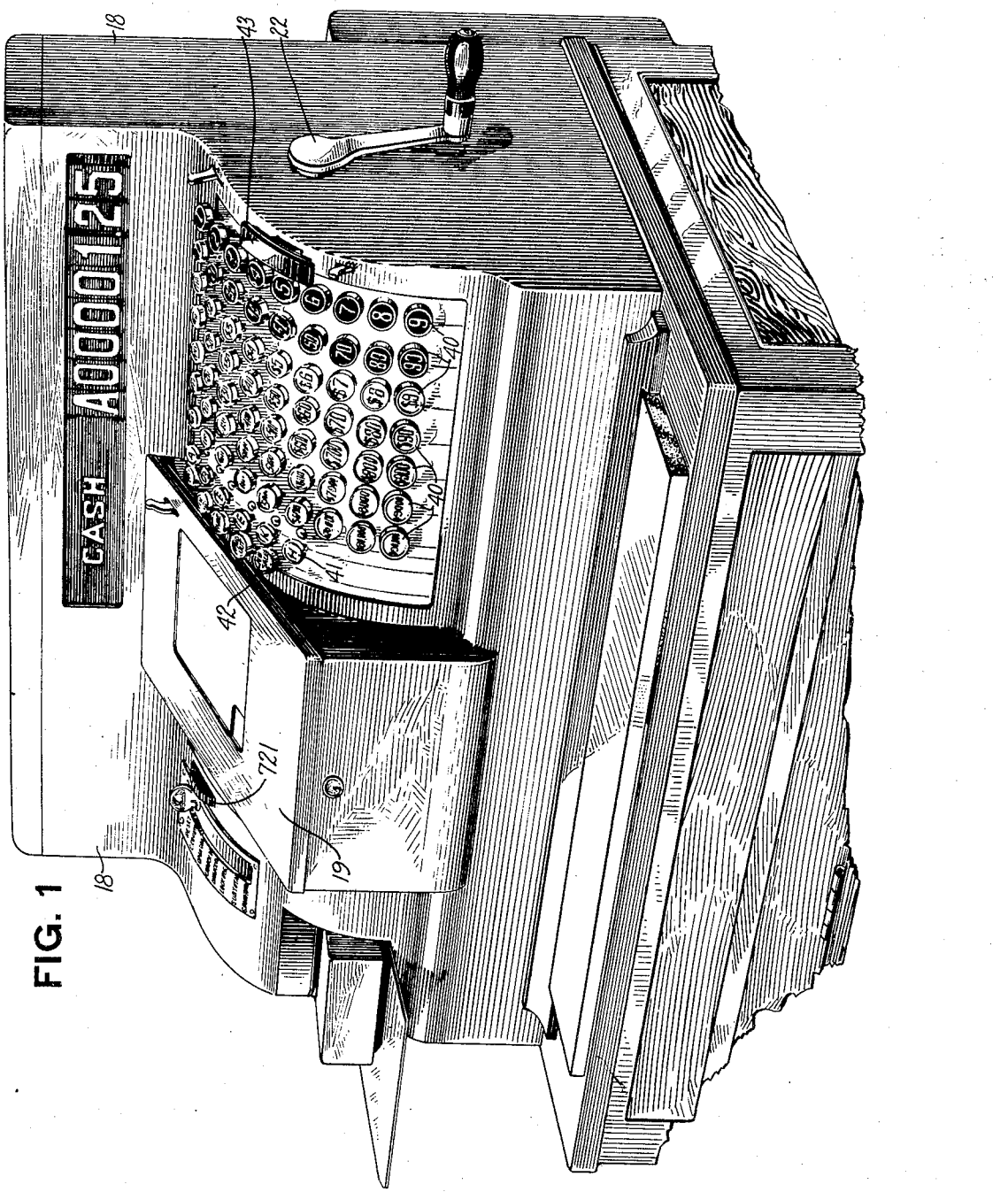
Fig. 1 is a perspective view of the complete machine.

Described in general terms, the essential elements of this divisional application are embodied in a machine known as the "key set, motor or crank operated type."

The machine used for illustrative purposes contains seven banks of amount keys, a bank of clerks' keys, and a bank of transaction keys. A motor bar is also provided to release the machine for operation.

The machine is provided with certain interlocks to compel proper operation of the machine.

Associated with each bank of keys is a positively driven differential segment from which motion is imparted to mechanisms for adjusting necessary type carriers and the totalizer elements provided in this machine.

Located approximately at the mid portion of the machine is a normally stationary reel, in which are mounted, in the illustrated machine, six clerks' totalizers, four transaction totalizers, and one grand totalizer. Mounted on each totalizer shaft is a special counter, which registers the number of times its respective totalizer has been selected for operation. A No sale counter is also provided in the reel for registering the number of No sale transactions entered in the machine. Also mounted on a shaft supported in the reel are a set of item type carriers and two special type carriers, which correspond, respectively, to the banks of clerks' and transaction keys. Also mounted on the shaft supporting these item carriers is a consecutive number or special counter which registers the number of Cash, Received on account, and Paid out transactions entered in the machine.

The illustrated machine is provided with a two-key single lock control mechanism, including a control lever which is movable to several positions of adjustment. All except the bottom or grand total position are made accessible by the key in the hands of the store manager, and all positions, including the grand total position, are made accessible to an auditor by inserting a different key in the control lock. When this lever is in the uppermost position, the machine is conditioned to reset the consecutive counters provided in the reel and also the consecutive number counter associated with the check and slip printing mechanism.

The machine is provided with novel means for simultaneously resetting the above mentioned special or consecutive number counters, one of which is located in the totalizer reel and the other remotely located therefrom in the printing mechanism. When the control lever is moved into the bottom or grand total position, it controls mechanism whereby the totalizers may be successively brought into a position to be reset to zero upon continued operation of the machine.

Suitable interlocks are provided to insure against any misoperation of the machine. Locks are also provided for locking all of the moving parts in the totalizer reel against movement, so that they will remain in place when the reel is rotated during total taking and resetting operations. The gears of the transmission line are also locked against operation when said line is out of normal position, so that the gears will properly mesh with their related gears in the machine proper, when the transmission line is restored. An interlocking mechanism is also provided between the main operating mechanism and the reel, so that the machine cannot be operated after the control lever has been moved to sub-total or grand total position unless the reel is moved into a total printing position. An interlock is also provided to prevent operation of the machine when the reel has been arrested between total printing operations.

DETAILED DESCRIPTION

*Framework*

The various parts of the machine are supported by a suitable framework comprising a base 10

(Figs. 2 and 22), two main side frames 11 and 12, and two intermediate frames 13 and 14. These frames are all secured to brackets 15 attached to the base 10. A plate 16 extending across the back of the machine is fastened to bracket 17 to act as a brace for all the frames.

The mechanisms in the machine are enclosed by a cabinet 18 which has a hinged lid 19, so that access may be had to the printing mechanism for removing the printed record strip and also for replenishing the supply of paper when necessary.

Other suitable openings are provided in the cabinet for receiving the key banks and other control mechanisms, as shown in Fig. 1.

Operating mechanism

Figure 2:
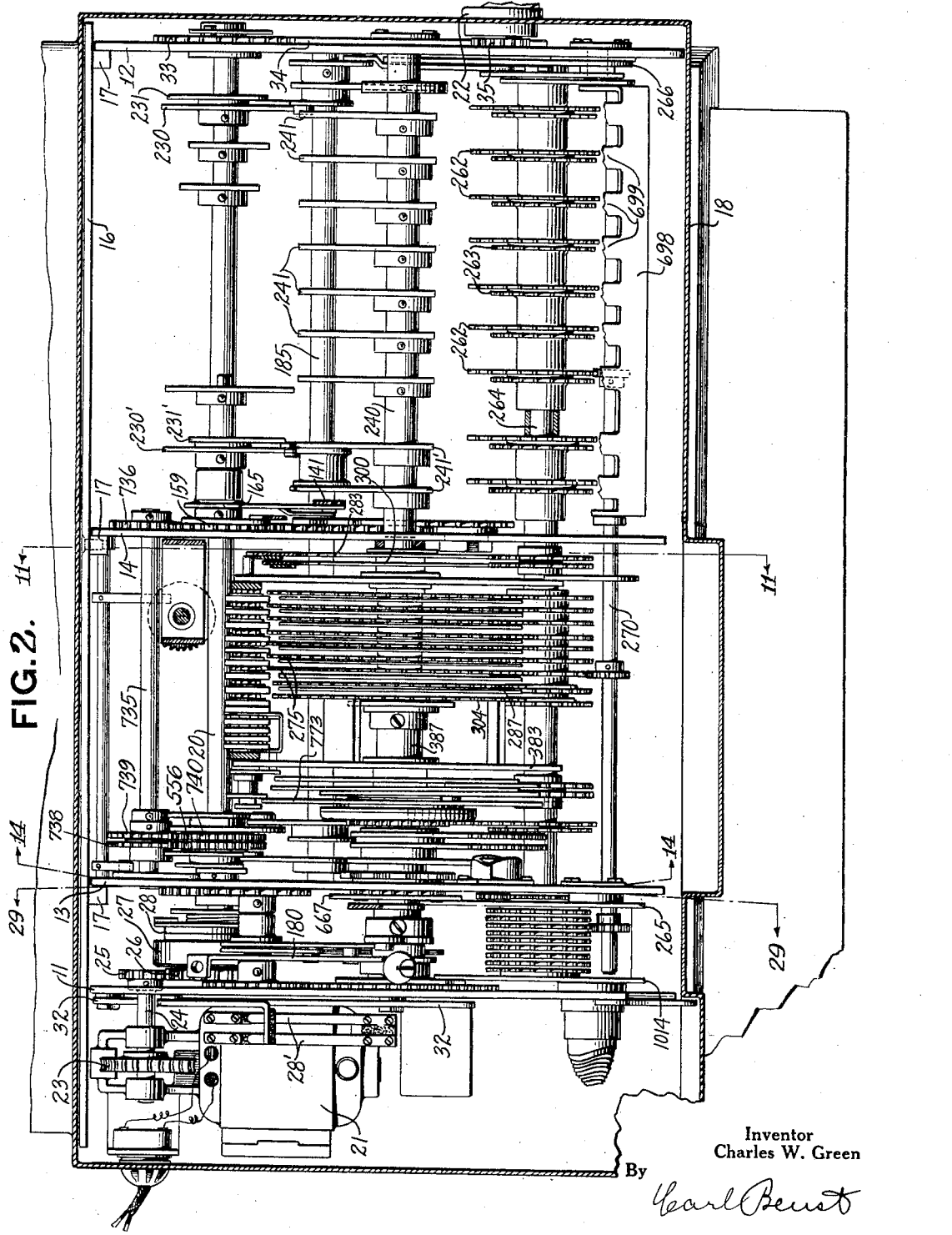
Fig. 2 is a plan view of the mechanisms located substantially below the mid-portion of the machine.

Power is imparted to the various mechanisms by a main driving shaft 20 (Figs. 2 and 3) driven either by an electric motor 21 or a hand operated crank 22. The shaft 20 is given one complete rotation at each operation of the machine. As shown in Fig. 2, the usual reduction gearing designated generally by the character 23 is provided between the electric motor and the short shaft 24, which extends through an opening in the frame 11 and carries a pinion 25 which meshes with the gear 26 attached to a flanged disc 27 of a clutch 28. Cooperating with the clutch 28 is a member 29 fixed to the end of the shaft 20 to cooperate with the flanged portion of the disc 27 to cause the clutch members 28 and 29 to drive the shaft 20 when the motor is operated.

The control for the motor switch 28' is generally shown in Figs. 2 and 7. The clutch and switch control mechanism associated with the motor 21 are of a well known type such as that disclosed in the United States patent to Charles F. Kettering and William A. Chryst, No. 1,144,418 issued June 29, 1915, and therefore this mechanism will not be described any further.

To operate the motor it is only necessary to rock an arm 30 (Figs. 3 and 7) out of engagement with a plate 32' and notches (not shown) in the locking plates of the clutch and switch control mechanism.

The motor 21 is mounted on a support 32 attached to the frame 11 by suitable screws or bolts.

Referring to Fig. 2, it can be seen that the shaft 20 has secured thereon a pinion 33 which meshes with a large idler gear 34, which in turn meshes with a gear 35 driven by a hand crank 22. By this mechanism, means is provided for driving the shaft 20 manually. A suitable clutch mechanism is provided between the crank 22 and the pinion 35 which permits movement of the gears 33, 34, and 35 without moving the crank 22 when the machine is operated by the electric motor 21. Suitable means is also provided to permit removal of the crank 22. A form of such mechanism is shown and described in the United States patent to Frederick L. Fuller, No. 1,394,256, issued October 18, 1921.

Keyboard

The keyboard (Fig. 1) is composed of seven banks of amount keys 40, one bank of clerks' keys 41, and one bank of transaction keys 42. A motor bar 43 is also provided for effecting release of the machine.

These banks of keys 40, 41, and 42 control the entry of amounts in totalizers mounted in a totalizer reel during item entering operations and also cooperate with a series of interlocks which allow the machine to be released in item entering operations only after the keys have been operated in a certain sequence. The details of the keys and these interlocks do not form a part of the invention being claimed in this application and will not be described further herein. For details of this mechanism, see the parent case, Patent No. 2,063,091.

Motor operation controls

The motor bar 43 is operable to release the machine for operation. When the proper amount, clerks', and transaction keys have been operated in item entering operations, shaft 123 will have been released for operation, as fully described in the parent case.

Mounted on shaft 123 in close juxtaposition to the inner side of side frame 12 is an arm 124, as shown more clearly in Figs. 7 and 9. The upper portion of arm 124 is provided with an open slot 125 which receives a pin 126 provided on link 127. Link 127 is pivotally supported by arms 128 and 129 pivoted respectively on studs 130 and 131 provided in side frame 12. Fixed to motor release bar 43 is a plate 43' slidably mounted on studs 132 as shown in Fig. 7. A roller 133 provided at the lower end of plate 43' normally engages a foot 134 provided at the lower end of link 127. Thus, it is seen that when the motor bar 43 is depressed, roller 133 will be moved out of engagement with foot 134 and spring 135 will move link 127 downwardly if shaft 123 has been released. A depending arm 136 is fixed to a shaft 137, which shaft is also journalled in side plates 12 and 14. A hook member 138 pivoted on shaft 79 normally engages the lower end of arm 136 as shown in Fig. 9. Also fixed to shaft 137 is a substantially horizontal arm 139 having pivoted to the outer end thereof, at 140, a spring urged link 141. The lower end of link 141 is provided with a slot 142 which receives a pin 143 attached to the forward end of an arm 144. Arm 144 is fixed to shaft 145 which has also fixed thereto the arm 30 which normally engages the locking plates associated with the clutch and motor switch control mechanism as shown in Fig. 7. Thus, it is seen that when the proper keys have been depressed and the motor bar 43 is depressed, roller 133 will be moved out of the path of projection 134 and spring 135 will move link 127 downwardly to the position shown in Fig. 8. By this action, shaft 123 will be rocked in a counter-clockwise direction, thereby carrying arm 124 with it. Pin 126 on link 127 will then engage cam face 146 (Fig. 7) provided at the upper side of hook 138, thereby disengaging hook 138 from arm 136. Spring 147 attached to link 141 will then move the latter upwardly, thus rocking shaft 145 in a clockwise direction as viewed in Fig. 7, to remove arm 30 from locking engagement with plate 32', with the result that the switch control mechanism will close the electric motor switch and cause the motor to drive shaft 20 through the connections previously mentioned.

Referring to Figs. 7 and 8, it will be seen that link 127 carries a pin 157 near the upper end thereof. This pin lies in the path of movement of arm 136 but is spaced therefrom to permit downward movement of link 127 to cam hook 138 out of engagement with arm 136. From the foregoing description, it is seen that immediately upon disengagement of hook 138 from arm 136, spring 147 will rock shaft 137 in a counter-clockwise direction, causing arm 136 to engage pin 157 and thereby move link 127 upwardly. Since pin 126 of link 127 projects into slot 125 of arm 124, shaft 123 will be rocked in a clockwise direction, when link 127 is actuated by arm 136 in the manner just described. When this occurs it is obvious that abutment 134 will be moved clear of the path of movement of roller 133 and spring 150 will restore the motor bar 43 to normal position, thereby bringing roller 133 into engagement with abutment 134 of link 127 as is shown in Fig. 7.

Referring to Fig. 7, it will be seen that a pinion 159 is fixed to driving shaft 20. Pinion 159 meshes with an idler gear 160, which in turn meshes with a gear 161 fixed to an intermittent gear 162. Intermittent gear 162 carries a pin 163 which normally occupies a position a short distance below the lower arm 164 of a two-arm lever 165 (Fig. 7), which is loosely pivoted on shaft 20. The upper arm 166 of lever 165 is provided with an open slot 167 at its forward end which receives a pin 168 extending laterally from link 141. Intermittent gear 162 is driven in the direction of the arrow, shown in Fig. 7, and from the arrangement of the parts just described it is clear that near the end of a complete rotation of gear 162, pin 163 will engage arm 164, thereby rocking the same downwardly. By this action, arm 165 will move link 141 downwardly against the tension of spring 147. These parts are so constructed that by the engagement of pin 163 with arm 164 in this manner, shaft 137 will be rocked in a clockwise direction substantially 20° beyond its normal position. When the parts have been thus moved, pin 163 will have moved out of engagement with arm 164 and spring 147 will restore the parts to normal position. When link 127 was elevated by arm 136 and held in its upper position by engagement of its lower end with roller 133, spring 169 rocked hook 138 in a counter-clockwise direction, so that the end of arm 136 reengaged the end of the hook when link 141 was drawn downwardly and released, thereby locking link 141 in normal position as shown in Fig. 7. A slot 142 provided at the lower end of link 141 permits a small movement of the link without a corresponding movement of lever 44.

Referring to Fig. 7 it is seen that a spring urged arm 170 is pivoted on a stud 171 located above the main driving shaft 20. A projection 172 provided at the lower end of arm 170, engages in a notch 173 provided in a cam 174. A pivoted locking pawl 175 is connected to arm 170 by a link 176. Locking pawl 175 is adapted to engage an arm 177 fixed to shaft 123 when the machine is operated by motor 21 or crank 22. The cam 174 is so designed that immediately upon rotation of shaft 20 pawl 175 will be moved into engagement with arm 177 and thereby lock shaft 123 against movement during an operation of the machine, as would be the case if the motor bar 43 was held depressed during the operation of the machine. A spring 170' is employed to restore arm 170 and the parts connected thereto to normal position.

*Control lever*

The locking elements above described are also adapted to be controlled by movement of the control lever 180 (Figs. 27, 29, and 31) toward Sub-total and Grand total positions. In these figures it is seen that a pitman 181 is pivoted at its upper end at 182 to a substantially horizontal arm 183 fixed to shaft 123. The lower end of pitman 181 is bifurcated to straddle a collar 184 provided on shaft 185. A cam plate 186 is fixed to shaft 185 and is adjusted by control lever 180 in a manner which will hereinafter be described. Plate 186 (Fig. 31) is formed with a plurality of radial slots 187a, 187b, and 187c, provided at the lower side of arcuate portion 188 thereof. Two radial slots 189a and 189b are provided along the outer periphery of arcuate portion 188. Pitman 181 is provided with a stud 190 which is adapted to move into any one of slots 187 depending upon the position of the control lever. The purpose for which slots 187a, 187b, and 187c are provided will be described hereinafter. A second stud 191 is formed on the same side of pitman 181 as is projection 190 and is spaced therefrom a distance equal to substantially the width of arcuate portion 188. Cam faces 192 are provided at each side of portion 188 and are adapted to engage studs 190 and 191 to move pitman 181 downwardly when the control lever is moved to certain positions of adjustments. When the control lever is in the Lock register or the Sub-total position, stud 191 will register with slot 189a and when it is in Grand total position, stud 191 will register with the slot 189b. It is seen from the construction of the parts just described that when the control lever is moved to the Lock register, Sub-total or Grand total position, pitman 181 is moved downwardly by the engagement of stud 190 with the inner cam face 192. This movement of pitman 181 rocks shaft 123 in a clockwise direction, thereby moving arm 124, Figs. 7, 8, and 9, in a clockwise direction so that the left-hand side thereof will assume a position beneath pin 126 provided on link 127. Upon depression of motor bar 43 (Fig. 7), link 127 will be moved to the left in the manner described heretofore, causing pin 126 carried thereby to move along the upper side of arm 124 and at the same time releasing hook 138 from engagement with arm 136 in the manner described hereinbefore. When hook 138 moves out of engagement with arm 136, spring 147 will urge link 141 upwardly with the result that arm 30 will be moved out of engagement with the motor switch control mechanism and the motor will again operate in the usual manner.

Mechanism is also provided to lock shaft 145 against movement until the totalizer reel has been properly positioned in bringing one of the totalizers and counters into printing position for a total taking operation. This mechanism will be fully described hereinafter.

*Differential mechanism*

The differential mechanism used in this machine is fully shown and described in the parent case, so that only a brief description will be given herein.

As shown in Figs. 2 to 6, cams 230 and 231 cooperate with rollers 232 and 233 on arms 234 and 235 of the lever 236 to actuate a gear segment 238, which segment meshes with a gear segment 239 fixed to shaft 240. Also fixed to shaft 240 are a series of driving segments 241, one for each bank of amount keys. Adjacent each driving segment 241 is a differential segment 242 loosely mounted on shaft 240. A pawl 245 is pivoted on each differential segment 242 and is provided with a projection 246 which normally engages in a notch 243 provided at the forward end of its related driving segment 241. Cams 230 and 231 are so designed that the driving segments 241 will first be rocked downwardly and then restored to normal position at each operation of the machine during one complete rotation of shaft 20. Pawl 245 is also provided with a projection 247 at the forward end thereof which is adapted to engage in any one of a series of notches 248 provided at the lower side of a differential latch retaining plate 61.

If no key in the bank is depressed, the engagement of nose portion 249 of a respective stop arm 74 will cause pawl 245 to be cammed out of notch 243 of driving segment 241, when the latter is moved downwardly. When a pawl 245 is moved in this manner, the projection 247 thereon will enter into the first notch 248 of plate 61. A notch 251 is also provided at the forward end of pawl 245 which is adapted to engage the lower end of a depressed key. When a key is depressed, zero stop pawl 72 will be rocked in a clockwise direction, bringing the depending stop arm 74 out of engagement with a nose 249. Driving segment 241 will then rock its associated differential segment 242 downwardly until the end of pawl 245 strikes a depressed key, when it will be cammed upwardly out of engagement with notch 243 of the driving segment and the upper projection 247 thereof will enter into a notch 248 in plate 61 adjacent the depressed key.

The differential 242 is positively returned to its normal position by the projection 253 engaging the latch 245. The movement of the latch by 253 causes the latch to be cammed out of the notches 248 and into the notch 243 of the segment 241.

Cams 230' and 231' (Figs. 2, 3, and 5), cooperate with rollers 254 and 257 mounted on arms 255 and 258 of the actuator 256 to cause the operation of the clerks' and transaction differentials in a similar manner.

Transmission mechanism

Figure 4:
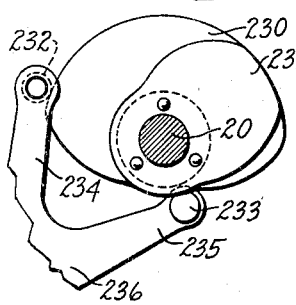
Fig. 4 is a detail of the cams for operating the amount differential segments.
Figure 5:
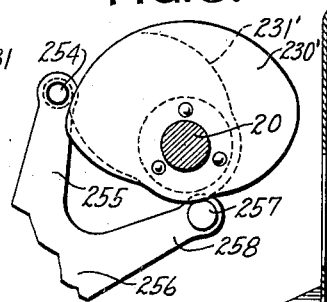
Fig. 5 is a detail of the cams for operating the clerks' and transaction differential segments.
Figure 6:
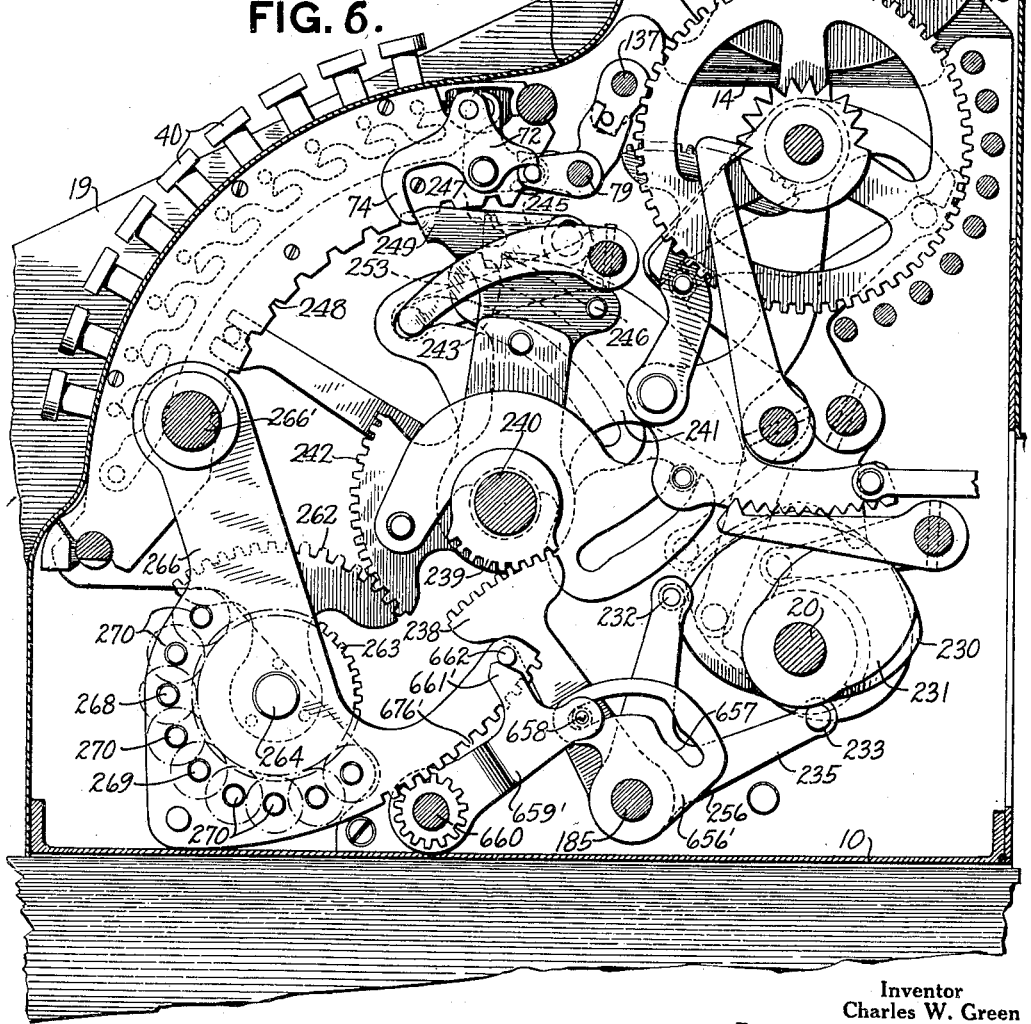
Fig. 6 is a section of the machine showing the differential and key section.

Referring to Fig. 6, it will be seen that each differential segment 242 meshes with a segmental gear 262 which is fixed to a corresponding gear 263 loosely pivoted on a shaft 264 journalled in the frames 265, 266, and 1014 (Fig. 4). The transmission mechanism comprises nine shafts journalled in frames 265 and 266 which are mounted in an arc about gears 263 (see also Figs. 27 and 29). Frames 265 and 1014 (Fig. 4) are pivoted around shaft 1012 (Fig. 29), while frame 266 is pivoted on a stud 266' (Fig. 27) fixed to supporting frame 12 and in axial alignment with shaft 1012.

The shafts 268, 269, and 270 have gears fastened thereto which mesh with gears 263. Other gears fastened to these shafts cooperate with totalizer actuators and selectors and also with the printing mechanism during item entering operations to control the operation of these parts by the differentials related to the amount, clerks', and transaction keys. For total taking operations the entire transmission line is swung out of engagement with the gears associated therewith by movement of the control lever to a total taking position. The mechanism for performing this function will be described in detail hereinafter.

Totalizer reel

In the illustrated machine there are six clerks' totalizers 372, (Figs. 10 and 11), four Transaction totalizers 373, and one Grand totalizer 374. Adjacent each clerk's totalizer 372 is a special counter 372' for registering the number of times its respective totalizer has been selected for operation. Adjacent each Transaction totalizer 373 is a special counter 373' for registering similar operations of the Transaction totalizer. Also adjacent the Grand totalizer 374 is a special counter 374' (Fig. 10) which registers the number of times the Grand totalizer has been selected for operation.

Carried on a shaft 376 in the reel are a series of item type wheels 377 (Figs. 10 and 11), one for each denominational order, a clerk's type wheel 378 (Fig. 10), and a Transaction type wheel 379. Adjacent the type carrier 379, as shown in Fig. 10, is a special counter 380 for registering the number of Cash, Received on account, and Paid out transactions effected in the machine. A No sale counter 381 for registering the number of No sale operations of the machine is also provided in the reel. Fig. 11 shows the arrangement of the totalizers and counters in the reel.

The A totalizer for registering the Cash and Received on account transactions effected by the A clerk is located substantially at the top of the reel. To the right thereof are arranged the B, D, E, H, and K totalizers for registering similar transactions effected by the B, D, E, H and K clerks, respectively. Next in order is the Paid out totalizer for registering the total of the Paid out transactions. Adjacent the Paid out totalizer is the Charge totalizer for registering the total of all Charge transactions entered in the machine, and adjacent the Charge totalizer is positioned the Grand totalizer which registers the total of the Cash and Received on account transactions effected in the machine. Next in order is the No sale counter for registering the number of No sale transactions effected in the machine. Next to the No sale counter is mounted the Received on account totalizer for registering each Received on account transaction effected in the machine. Next in order is the Cash totalizer for registering each Cash transaction effected in the machine. Between the Cash totalizer and the A totalizer is mounted the shaft 376 which supports the item type wheels 377, the Clerk and Transaction type wheels 378 and 379, and the special consecutive counter 380.

The structure of the reel will now be described in detail. The reel in general is indicated by the reference numeral 375 and comprises a pair of spaced end plates 382 and 383. End plate 382 has fixed thereto a sleeve 384 which extends to the right-hand side thereof, as is shown in Fig. 22. A reduced portion of the sleeve 384 extends through an aperture in end plate 382, Fig. 22. Sleeve 384 is mounted on a shaft 386 which extends through the center of the reel and which is journalled in frames 11, 13 and 14, in axial alignment with shaft 249, as shown in Figs. 2 and 22. Fixed to the inner side of end plate 383 (Fig. 22) is a comparatively long sleeve 387 which extends through an aperture in said plate 383. The reduced portion of sleeve 387 extending to the right of end plate 383 receives the end of a sleeve 388. A screw 388a passing through the enlarged portion of sleeve 388 fastens the latter to shaft 386. The reduced portion 388' of sleeve 388 extends to the right of the enlarged portion just mentioned. A relatively long sleeve 389 is loosely mounted on shaft 386. The inner diameters of the end portions of this sleeve are enlarged to receive the reduced portions 385 and 388', respectively, of sleeves 384 and 388.

The actuating gears 275, 287 and 394, and the transfer plates 455, provided for actuating the totalizers and type carriers supported in the reel, are loosely mounted on sleeve 389. The purpose of providing this series of interconnecting sleeves is to permit shaft 386 to be removed wthout causing the inner mechanism supported thereby to drop out of engagement with the reel proper. When the shaft 386 is removed, the entire reel may be lifted from the machine as a unit.

The end plates 382 and 383 of the reel are rigidly connected by three tie bars 389'. The shaft 376 which supports the item type carriers 377 (Figs. 10 and 11), the special type carriers 378 and 379 (Fig. 10), and the consecutive number counter 380, extends through alined apertures 390 (Fig. 12) provided in the end plates 382 and 383. Each totalizer frame carries a stud 391 at the right-hand end thereof which is received in an aperture 392 provided in end plate 382. A similar stud 391 is provided at the left-hand side of each totalizer frame and is adapted to be inserted in a slot 393 provided in end plate 383. The lower end of each slot 393 is substantially circular in form and has a diameter slightly larger than that of the stud 391.

Thus, in order to properly place a totalizer frame in the reel, it is only necessary to insert stud 391 into its respective aperture 392 and then lower stud 391 at the left-hand end of the frame into the slot 393. A collar is then placed on the stud 391 and pressed into the enlarged opening of the slot 393. Thus, the totalizer frame is properly held in place. A notch 395 (Fig. 12) is provided adjacent each aperture 392 of end plate 382 for receiving the totalizer shaft 396 of a respective totalizer. A similar notch 397 is provided in plate 383 in alinement with notch 395. This permits the totalizer shaft 396 to be rocked into and out of engagement with the actuating gears 275. The particular construction of the totalizer and totalizer frame is of the well known type, and therefore will not be described in detail herein. All of the totalizer frames are placed in the reel in the manner just described. The No sale counter 381 (Fig. 10) is supported in a bracket 381' fixed to end plate 383.

Details of totalizer selection and engagement and special counter selection and actuation during item entering operations are fully explained in the parent case and will not be included herein.

*Consecutive number or special counter in printer*

Figure 35:
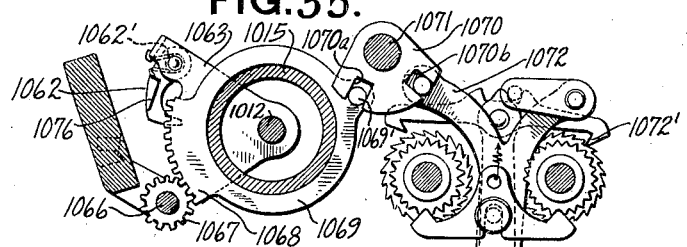
Fig. 35 is a detail of the means for operating the consecutive numbering device associated with the check and slip printer.
Figure 38:
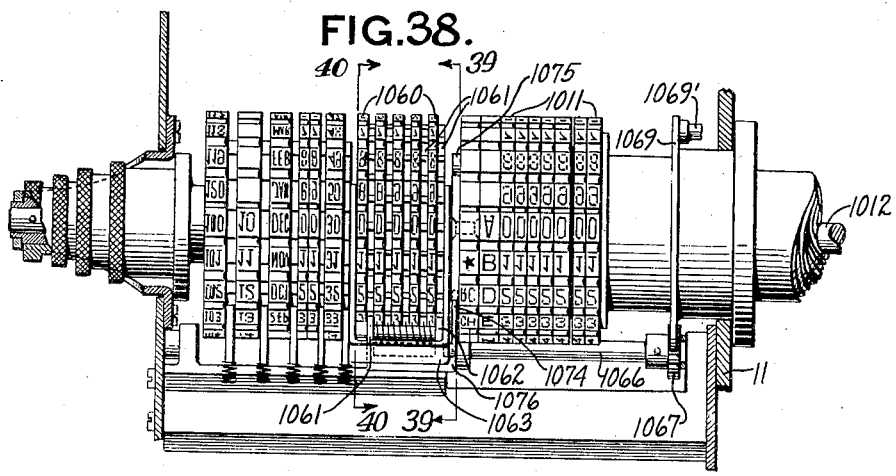
Fig. 38 is a plan view of the type line including the consecutive counter associated with the check and slip printer.
Figure 39:
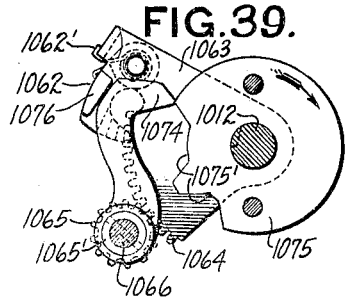
Fig. 39 is a section on line 39—39 of Fig. 38.
Figure 40:
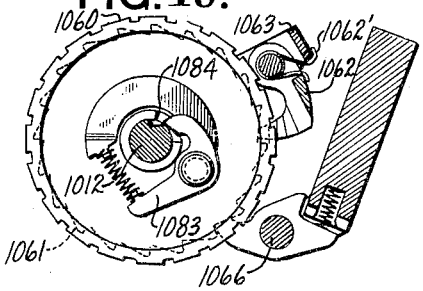
Fig. 40 is a section on line 40—40 of Fig. 38.

The consecutive numbering device associated with the check and slip mechanism consists of five type wheels 1060 (Figs. 38 and 40) mounted upon the shaft 1012. These type wheels are provided with two similar sets of type and are of the usual construction, each having a ratchet wheel 1061 attached thereto which is adapted to be engaged by a multi-pronged pawl 1062. Pawl 1062 is given an oscillatory movement by a bail 1063 as shown in Figs. 35 and 39. This type of mechanism is well known in the art as the deep notch type, and is shown and described in the patent to Thomas Carney, Number 876,295.

Bail 1063 is loosely mounted on shaft 1012 and has integral therewith a gear segment 1064 which meshes with a gear 1065 fixed to shaft 1066. Also fixed to shaft 1066 is a gear 1067 which meshes with gear segment 1068 fixed to a disk 1069. Disk 1069 is provided with a stud 1069' which engages a notch 1070a of a disk 1070 pivoted on rod 1071. Disk 1070 is also formed with a second notch 1070b into which projects a stud carried by the upper arm of a lever 1072 associated with the ribbon mechanism for the check and slip printer. Arm 1072 is oscillated by cams 1132 at each operation of the machine. Thus, it is seen that through the connections shown in Fig. 35, when disk 1070 is rocked by lever 1072, disk 1069 will rock shaft 1066, causing gear 1065 thereon to actuate bail 1063. Pawl 1062 carried by bail 1063 will then be actuated to operate counter 1060 to register a unit therein.

The consecutive number or special counter associated with the check and slip printing mechanism corresponds at all times with the consecutive number or special counter 380 (Fig. 10) provided in the totalizer reel. As was stated before, the pawl 1062 (Fig. 40) for actuating the consecutive number or special counter 1060 is actuated at each operation of the machine. Therefore, it will be necessary to provide a mechanism for disabling this counter for Charge and No sale transactions, since the consecutive number or special counter 380 is not selected for operation for such transactions. To this end a throw out pawl 1074 (Fig. 39) is provided which cooperates with a notched disk 1075 riveted to the type carrier 1011 (Fig. 38) carrying the Transaction type characters. Pawl 1074 (Fig. 39) is loosely pivoted upon the hub 1065' of gear 1065 and is formed with a nose portion which engages a disk 1075. For Charge and No sale transactions, pawl 1074 contacts with the outer or concentric portion of disk 1075. When in this position, the outer end of pawl 1074 will engage an extension 1076 provided on the counter actuating pawl 1062 and the latter will thus be held out of engagement with the associated ratchet wheels 1061. However, during an operation of the machine for Cash, Received on account, and Paid out transactions, the type carrier 1011 aforesaid will be adjusted in such a manner that the notches 1075' of disk 1075 will be brought into registering position with respect to the nose of pawl 1074, thereby releasing pawl 1062 for operation, which pawl then moves into engagement with the ratchet wheels by virtue of spring 1062'. It is understood, of course, that the operations of the parts are so timed that movement of disk 1075 is completed before pawl 1062 is actuated by the member 1063.

The consecutive number or special counter 380 provided in the reel and the consecutive number or special counter 1060 associated with the check and slip printing mechanism will be simultaneously reset to zero. The connections leading from the resetting mechanism to the counter 1060 will be briefly summarized.

Referring to Figs. 16, 28, 29, and 30, it will be seen that the pinion 787 (Figs. 16 and 29) fixed to the shaft 761 of the resetting mechanism meshes with the gear segment 788, which segment in turn meshes with a gear 1081 pinned to shaft 1012. The consecutive numbering wheels 1060 associated with the check and slip printing mechanism are each provided with the usual pickup pawls 1083 (Fig. 40) and each is adapted to engage in a long notch 1084 provided in shaft 1012. Thus it is clear that when shaft 1012 is rotated through the train of connections just described during the resetting operation of the consecutive number or special counter 380, counter wheels 1060 will also be reset to zero. It will also be noted that the resetting segment 788 is pivoted adjacent frame 265 supporting the transmission line, on the rod 1001 (Fig. 29), previously mentioned, and since the rod 1001 will swing outwardly with the transmission line when the control lever is moved to sub-total position, segment 788 will also be swung outwardly out of engagement with pinion 787, and thus no rotation of shaft 1012 will be effected after a grand total taking operation. As will be pointed out hereinafter, pinion 787 will rotate for each resetting operation of the totalizers, but inasmuch as the transmission line is disengaged during total taking and resetting operations of the totalizers, this movement will not be imparted to shaft 1012, since, as was just pointed out, resetting segment 788 is out of engagement with pinion 787. In order to prevent displacement of the segment 788 when it is disconnected from the pinion 787, the following locking means is provided.

Referring to Fig. 29, it will be seen that pivoted about shaft 268 is a two-arm lever 1085. The substantially vertical arm 1086 of lever 1085 is adapted to engage in a notch 1087 provided in gear segment 788. The rearwardly extending arm 1088 of lever 1085 is provided with a cam surface 1089 which engages a stationary pin 1090 projecting from supporting frame 13. A spring 1091 normally holds arm 1086 of lever 1085 out of engagement with notch 1087. From the construction and arrangement of the parts just described, it is seen that when the transmission line is swung outwardly, cam 1089 will immediately contact with pin 1090 to cause lever 1085 to rock in a counter-clockwise direction, thereby bringing the end of arm 1086 into notch 1087 of segment 788. Cam 1089 is so constructed that it will be in continuous engagement with stud 1090 to positively hold arm 1086 into engagement with notch 1087 and thus lock the parts against movement until the transmission line is again restored to normal position.

*Total printing and resetting*

When the machine is operated for item entering operations, the selection of totalizers in the totalizer reel is effected by properly adjusting selector plates 283 and 300 (Fig. 12), but the reel itself remains stationary. In total taking operations, however, it is necessary to rotate the reel to bring each totalizer to printing position in order to effect printing therefrom. Before the reel can be rotated, it is necessary to swing the transmission line, which it will be remembered normally transmits the motion of the differential segments to the actuating gears of the reel, so that it will not interfere with the movement of the reel. It is also important that the actuating gears, the transfer plates, and the cam shaft provided within the reel be locked against movement when the reel is rotated so that these parts will not vary from normal position during total taking operations. The mechanisms controlling total printing will now be described in detail.

Figure 34:
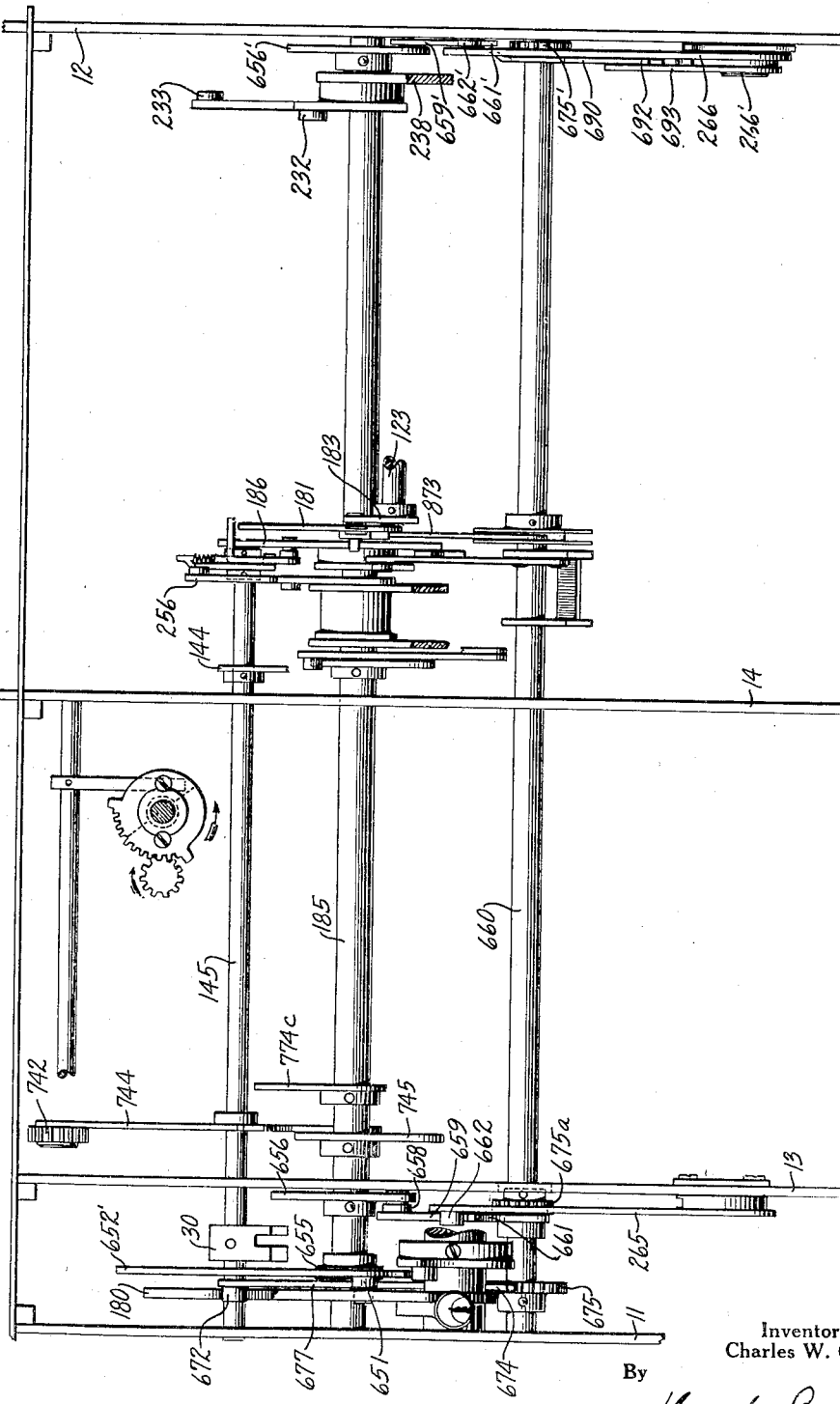
Fig. 34 is a general plan view of the control mechanism.

Referring to Figs. 27 and 29 it will be seen that the control lever 180 is provided with a cam slot 650' which receives a pin 651' provided on a segmental gear 652' loosely pivoted on shaft 653 journalled in supporting frames 11 and 13. A hook 654 is formed at the rearward edge of control lever 180 which engages shaft 653. These parts assist in guiding the control lever during its movement and also positively stop the same when reaching its uppermost position of adjustment. Segmental gear 652' meshes with a pinion 655 fixed to control shaft 185. Also fixed to control shaft 185 is a segmental plate 656 (Figs. 29 and 34), provided with a cam slot 657 which receives a stud 658 provided at the inner end of an arm 659 pivoted on shaft 660. A projection 661 is provided on arm 659 which engages a pin 662 provided on support frame 265 of the transmission line. There is a similar arm 659' (Fig. 34) pivoted on shaft 660 near the right hand end thereof provided with a projection 661' normally engaging a stud 662' provided on the other support frame 266 supporting the transmission line. A similar cam plate 656' fixed to shaft 185 cooperates with arm 659' in the same manner as cam plate 656 cooperates with arm 659. By this construction it is seen that the transmission line is positively held in normal position. As shown in Figs. 2, 14, 15, 22, 26, and 29, a disc 667 (Figs. 15 and 22) is fixed to an enlarged portion 803 of sleeve 802 by screws 573. Sleeve 802 is mounted on shaft 386 adjacent sleeve 387 and has fixed thereto a semicircular disc 801 lying in the same plane as a similar disc 800 fixed to sleeve 387, which sleeve, it will be remembered, is fixed to end plate 383 in the reel. Screws 573 also rigidly connect gear 668 (Figs. 15, 22, and 26) and notched disc 795 (Figs. 15, 16, and 22) to sleeve 802 so that all of these members will be moved as a unit when the reel is rotated. Disc 667 is provided with an arcuate slot 669 (Figs. 26 and 29) which receives a pin 670 provided at the inner side of frame 265 (Fig. 29). Slot 669 is concentric with the pivots about which side frames 265 and 266 swing. Figures 30 and 34 show the position of the stud 670 when the transmission line is in operative position. When in this position it will be noted that stud 670 assumes a position at the inner end of slot 669. Therefore, stud 670 when in the position shown in Figs. 26 and 29 is also effective to positively lock the reel against rotation.

Control lever 180 is also provided with a cam edge 671 (Figs. 26 and 29) at the rear end thereof which engages a stud 672 provided on the upper arm 673 of a segmental gear 674 which is pivoted on shaft 653. Segmental gear 674 meshes with pinion 675 (Figs. 22 and 34) pinned to shaft 660. A similar pinion 675a (Figs. 29 and 34) fixed to shaft 660 meshes with a rack segment 676 provided along the lower edge of side frame 265. Spaced from pinion 675a, shaft 660 has pinned thereto a similar pinion 675' (Figs. 27 and 34) which meshes with a rack segment 676' provided at the lower edge of side frame 266. The lower arm 677 (Fig. 27) of segmental gear 674 carries a stud 678 (Fig. 27) which engages cam surface 679 provided at the lower edge of control lever 180. Cam surface 679 acts as a companion cam for cam 671 and is provided to positively restore segmental gear 674 to normal position when the control lever is moved in the reverse direction. Cam surface 671 provided on control lever 180 is so constructed that during the initial movements of control lever 180, pin 672 will ride on the portion thereof which is concentric with shaft 386. Thus no movement will be imparted to gear segment 674. However, when the control lever is moved to Sub-total position, the raised portion of cam 671 will engage with stud 672 thereby causing segment 674 to rock in a clockwise direction, which motion is imparted to shaft 660, causing pinions 675a and 675' (Fig. 34) to actuate the support frames 265 and 266 thereby swinging the transmission mechanism out of engagement with the associated gears in the machine proper. At the same time stud 670, shown in Figs. 26 and 29, will be moved to the dotted line position abutting against a projection 680 provided on disc 667. Projection 680 is provided so as to prevent rotation of the reel in the counterclockwise direction as viewed in Fig. 26.

Integral with arm 659', (Fig. 27) is a forwardly and upwardly extending arm 690 which is provided with an open slot 691 at its upper end for receiving a stud 692 provided near the lower end of a depending arm 693 pivoted on stud 266'. The lower end of arm 693 is provided with a cam slot 694 which receives a stud 695 provided on an arm 696 which pivots about a stud 697 provided at the inner side of frame 266. Integral with arm 696 is a bail 698 which carries a series of fingers 699 which are adapted to engage gears 263 which it will be remembered are loosely pivoted on shaft 264 of the transmission line.

It will be noted in Fig. 29 that cam slot 657 in plate 656 is provided with a dwell portion which permits movement of control lever 180 without rocking arms 659 (Fig. 29) and 659' (Fig. 27) during the first portion of its movement. The operation of control lever 180 and the mechanisms controlled thereby will be described further hereinafter, however, it may be stated here that when lever 180 is moved to Sub-total position, arms 659 and 659' will be cammed downwardly with the result that projections 661 and 661' respectively thereon will be moved out of engagement with studs 662 and 662' provided on the side frames of the transmission line. At the same time, arm 690 will rock arm 693 in a counterclockwise direction thereby causing cam 694 to rock the alining fingers 699 into engagement with gears 263 and thereby hold the latter against movement.

When the control lever 180 is restored to its uppermost position, the parts just described will assume the position shown in Figs. 27 and 29. It will be noted that cams 650' and 671 are so designed that while the former is effective to rock plate 656 (Fig. 29), the latter is ineffective and when cam 671 becomes effective to actuate segment 674 (Fig. 29) the dwell portion of cam slot 650' will have reached pin 651' and thereby movement of disc 656 will be arrested.

It will be seen later when the control mechanism is described in detail that no motion is imparted to segmental gear 652' or shaft 185 when the control lever 180 is moved from Lock register position to Sub-total position. During this movement of the control lever, shaft 660 (Figs. 27 and 29) will be rotated however to swing the transmission line out of engagement with the gears in the machine proper with which it cooperates for item entering operations of the machine.

It is therefore seen that mechanism is provided for positively swinging the transmission line out of engagement with the actuating gears in the reel, at which time, as fully explained in the parent case, all of the moving parts within the reel and transmission line are locked against operation so that when the latter is again brought back into operative position all of the parts will be in proper alignment and therefore no interference will occur between the cooperating parts.

In order to rotate the reel to bring the totalizers and special counters into printing position, the following mechanism is provided: Referring to Figs. 1, 22, and 26, it will be seen that a rigid thumb wheel 721 protrudes through a slot provided near the top left-hand end of the cabinet. Fixed to thumb wheel 721 is a pinion 722 which meshes with a large gear 723 which in turn meshes with a gear 668 which, it will be remembered, is fixed to sleeve 802 mounted on shaft 386. Adjacent thumb wheel 721 on the cabinet is a legend plate bearing legends representing the various totalizers and counters provided in the reel. An index pointer 724 is attached to the top of a bent arm 725 and is adapted to be moved variable distances to designate the totalizer or counter which has been moved to printing position. Bent arm 725 is loosely mounted on sleeve 802, as shown in Figs. 22 and 26, and is provided with a laterally extending stud 726 which engages in an open slot 727 provided at the lower end of a depending arm 728 pivoted at 729 to frame 13. Arm 728 is provided with a laterally extending stud 730 intermediate its ends which operates in a cam slot 731 provided in gear 723.

Thus, it is clear that when the control lever 180 has been moved to one of its total taking positions, in order to bring any one of the totalizers or special counters to printing position, it is only necessary to rotate thumb wheel 721 until the index finger 724 registers with the legend corresponding to the particular totalizer that it is desired to take the total from.

As fully explained in the parent case, when the control lever 180 is moved to one of its total positions, all of the keys are locked against operation but the mechanism for releasing the machine is so conditioned that after the reel has been rotated to bring one of the totalizers or counters to printing position, depression of the motor bar will release the machine for operation. Thus, after bringing a selected totalizer or counter to printing position in the manner just described, it is only necessary to depress the motor bar 43, which will cause the machine to operate to effect a printing impression therefrom.

Figure 3:
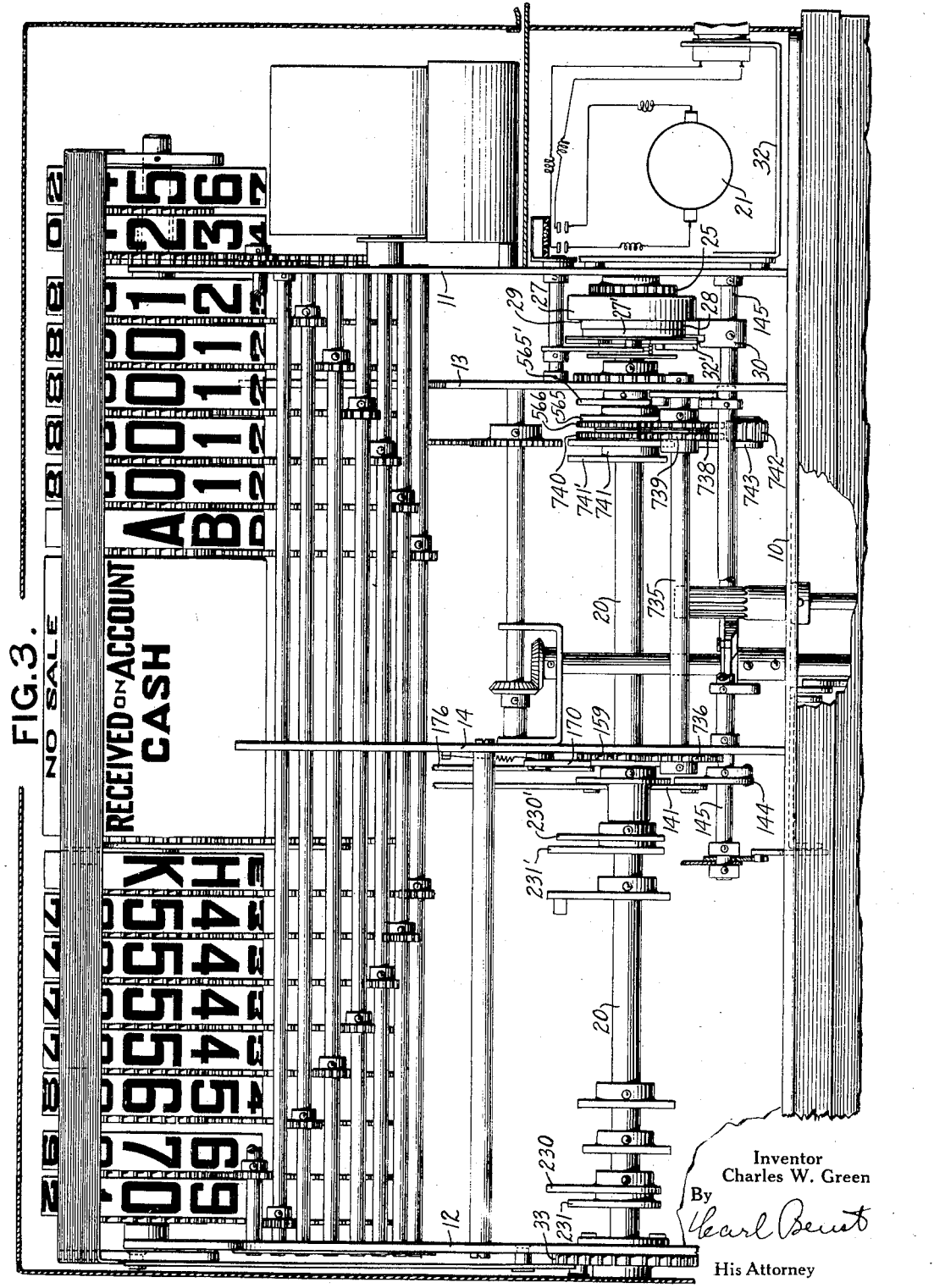
Fig. 3 is a rear elevational view of the machine with the back portion of the cabinet removed.

When the control lever 180 is moved to Subtotal position the reset mechanism is not conditioned for operation. However, when control lever 180 is moved to its Grand total position, resetting of the selected totalizer will be effected after a printing impression has been taken therefrom. Referring to Figs. 2 and 3, it will be seen, as was pointed out hereinbefore, that journalled in frames 13 and 14 slightly to the rear of the main driving shaft 20 is a short shaft 735. Adjacent supporting frame 14 shaft 735 has pinned thereto a gear 736 which meshes with a gear 159 fixed to the main driving shaft 20. Near its other end shaft 735 has pinned thereto a gear 738 which meshes with gear 566 loosely mounted on main driving shaft 20. Fixed to gear 566 are cams 565 and 565' also loosely mounted on shaft 20.

Thus it is seen that when main driving shaft 20 is rotated upon operation of the motor, cams 565 and 565' will be driven by gear 738 through the train of gears just described to operate the printing mechanism. Adjacent gear 738 is a gear 739 which is loosely mounted upon shaft 735. Gear 739 meshes with a gear 740 loosely mounted on shaft 20 which gear is located adjacent gear 566. Gear 740 has fixed thereto cams 741 and 741' (see also Figs. 13 and 14) which are also loosely supported on shaft 20. It therefore, is clear that for normal operations of the machine since gear 739 is loosely mounted on shaft 735, cams 741 and 741' for operating the resetting mechanism will not be moved.

However, when the control lever is moved to Grand-total position a wide pinion 742 mounted on an arm 743 of a three-arm lever 744 (Figs. 14 and 31) will be rocked upwardly into mesh with gears 738 and 739. Thus it is seen that upon movement of shaft 20 both gears 738 and 739 will be operated to actuate their respective cam members.

Referring to Fig. 31, it is seen that the substantially vertical arm 744′ of lever 744 is provided with a projection which moves into engagement with gear 740 when pinion 742 is moved to inoperative position. This prevents movement of gear 740 when out of engagement with pinion 742 and also insures proper meshing of latter with gear 740 when it is moved to operative position.

Referring to Figs. 14 and 15 it is seen that fixed to control shaft 185 is a segmental disc 745 which is provided with a cam slot 746. Cam slot 746 receives a pin 747 mounted on arm 748 of the three-arm lever 744. Fig. 14 shows the position of the parts when control lever 180 is in the Open drawer position of adjustment (for positions see Figs. 31 and 32). It will be noticed that when control lever 180 is in this position, pin 747 assumes a position in the portion of cam slot 746 which is concentric with shaft 185. Thus no movement of three-arm lever 744 will be effected until segmental disc 745 is moved to bring the cam portion 746′ or 789 into engagement with pin 747. The portion 746′ of cam slot 746 is brought into engagement with pin 747 when control lever 180 is moved from Sub-total position to Grand-total position. When this occurs, three-arm lever 744 will be rocked in a clockwise direction, as viewed in Fig. 14, thereby causing the engagement of gear 742 with gears 738 and 739.

As shown in Figs. 13 and 14, cams 741 and 741′ engage rollers 750 and 751 respectively, provided on a two-arm lever 752 pivoted on shaft 185. Also pivoted on shaft 185 and fixed to arm 752 at 754 is a gear segment 755 (see also Fig. 15). Segmental gear 755 meshes with a gear segment 756 which is journalled on sleeve 802 as shown in Figs. 15 and 22. Fixed to gear 756 on either side thereof are gear segments 757 and 758.

Referring to Figs. 16, 18, and 19, it will be seen that gear segment 757 cooperates with a gear 759 which is provided with an internal thread for receiving a worm gear 760 formed at the righthand end of shaft 761. Pinned to shaft 761 adjacent worm gear 760 is a pinion 762 which meshes with gear segment 758. Gear 759 and pinion 762 are supported within the hollow portion of a bracket 763 which is fixed to the inner side of supporting frame 13 by screws 764 as shown in Fig. 16. The left-hand end of shaft 761 is journalled in suitable bearings provided in side frame 13 as is also shown in Fig. 16. Adjacent the inner side of frame 13 shaft 761 is provided with a peripheral groove 765 which receives a rectangular key 766 (Figs. 14 and 15) which is fitted within an elongated slot 767 formed in the flange of bracket 763 and lies in close juxtaposition to frame 13. Thus it is clear that shaft 761 is held against axial movement.

Pinned to each totalizer shaft 396 (Fig. 16) is a collar 768 which is provided with an enlarged portion 769 at the inner side thereof. This enlarged portion is provided with a slot 770 which receives a pin 771 projecting from its related totalizer frame when the totalizer shaft is in normal position. This mechanism is provided to hold its shaft against rotary movement. Spaced from enlarged portion 769 is a flange 772, as shown in Figs. 14, 16, and 21, which lies adjacent the inner side of a retaining disc 773 (Fig. 14) near the outer periphery thereof. This disc is loosely mounted on sleeve 802 and is provided to prevent axial movement of the totalizer shafts, during normal operations of the machine.

An arm 774 is fixed to disc 773 by rivets 775 as shown in Figs. 14, 15, 22, and 26. Arm 774 is provided with pins 774a and 774b (Fig. 26) which are engaged by a cam 774c fixed to control shaft 185. Adjacent flange 772 (Fig. 19), collar 768 is provided with an arcuate flanged clutch member 776 (see also Fig. 14) which is concentric with shaft 386. The cross section of clutch member 776 is substantially T-shaped. This flanged clutch member is adapted to move into engagement with a cooperating clutch portion 777 provided at the inner end of gear 759, as is shown in Fig. 19, when the totalizer reel is rotated to bring a totalizer supported thereby into printing position. It will be noted in Fig. 18 that gear segment 757 is provided with a concentric portion 778 upon which teeth 779 of gear 759 rest. This forms a lock for the gear 759 until the concentric portion 778 moves past the gear 759 when the teeth of gear segment 757 will engage the teeth of gear 759 to rotate the same.

The operation of the parts just described is as follows. In order to select a totalizer for operation thumb wheel 721 (Fig. 26) is actuated to rotate the reel to select the proper totalizer. By this movement the arcuate clutch member 776 provided at the end of collar 768, which is pinned to totalizer shaft 396, will move into engagement with the cooperating clutch member 777 provided at the inner end of gear 759 as shown in Fig. 14. Now upon operation of the machine, the cams 741 and 741′ (Fig. 14) will actuate gears 757 and 758 in a clockwise direction as viewed in Figs. 18 and 20.

From the construction of segments 757 and 758 it will be seen that the latter will engage its pinion 762 and rotate the same immediately while gear 759 remains stationary with the result that upon rotation of pinion 762 (Figs. 16 and 19) worm gear 760 will also be rotated causing gear 759 to move axially due to the action of worm gear 760 with the cooperating internally threaded portion of gear 759. By this movement the totalizer shaft will be moved axially, causing notches 780 (Figs. 16 and 17) provided therein to register with their respective spring urged pawls 781 (Fig. 17) provided on the totalizer wheels. When gear 759 and a totalizer shaft are moved axially, in this manner, it is clear that the slot 770 (Fig. 16) provided in the enlarged portion 769 of collar 768 will be disengaged from the stud 771 projecting from its related totalizer frame. Gear 759 will be moved in this manner until the teeth of gear segment 757 engage the teeth of gear 759 when the latter, as well as gear 762, will then rotate as a unit causing the totalizer shaft 396 to rotate in the direction of the arrow shown in Fig. 17 a distance equal to slightly more than nine-tenths of a complete revolution.

Upon the return movement of gears 757 and 758, the totalizer shaft will be rotated in the reverse direction and the notches 780 therein will engage their respective pawls 781 and thereby rotate the totalizer wheels associated therewith to zero, at which time the teeth of gear segment 757 will have moved out of engagement with the teeth of gear 759 and the concentric portion 778 will again prevent said gear from rotating further. Gear 762, however, will continue to rotate with the result that gear 759 and the totalizer shaft connected thereto will be moved axially to the right to restore the parts to normal position as shown in Fig. 16.

The mechanism just described is so timed with the printing mechanism that printing occurs before a resetting operation is effected. Referring to Fig. 16 it is seen that shaft 396 is provided with a long notch 780′. This notch is provided to engage the pick up pawls provided in the special counter wheels mounted on this shaft. Thus the special counter will be reset simultaneously with the resetting of its associated totalizer.

As shown in Fig. 23, disc 773 is provided with a notched portion 782 which, when brought into position adjacent a flange 772, permits the associated totalizer shaft to move axially. Notch 782 is normally out of registering position with the resetting mechanism. However, when the control lever is moved toward a total taking position, disc 773 will be moved by cam 774c (Fig. 26) thereby alining notch 782 with the resetting mechanism, and upon operation of the machine the totalizer shaft will be shifted axially to effect resetting of the associated totalizer wheels.

It will be seen by reference to Fig. 11 that the item type wheels have a larger diameter than the totalizer wheels and, accordingly, the radial distance from the shaft 376, supporting the item type carriers, to the center of the reel is slightly greater than the radial distance of any one of the totalizer shafts to the center of the reel. Therefore, in order to reset the consecutive counter that is mounted on the same shaft therewith it will be necessary to provide a slightly modified construction. To this end shaft 376 (Fig. 23) has pinned thereto a plate 783 carrying a laterally projecting stud 784 near the upper end thereof which is adapted to engage in slot 785 (Fig. 21) of clutch portion 777 provided in gear 759. A ring 786 (Fig. 23) is provided with a notch 786' which lies immediately below plate 783 when the parts are in normal position.

The customer counter (in axial alignment with the item type wheels on shaft 376), like the special counters provided on totalizer shafts 396, is provided with one long notch 780' (Fig. 24) which is adapted to cooperate with a pick-up pawl provided on each counter wheel similar to those associated with each of the totalizer wheels as shown in Fig. 17. For normal operations of the counter, the counter wheels are rotated in a direction away from the notch portion so that when the pawls register therewith they will simply ratchet over the notch and will not be stopped thereby. However, when the shaft is rotated towards its home position the abrupt portion of notch 780' will engage these pawls and restore each of the wheels to zero. Since stud 784 (Fig. 13) of plate 783 registers in slot 785 (Fig. 21) of gear 759 it is clear that when gear 759 is rotated shaft 376 will also be rotated to restore the consecutive number counter 380 to zero.

When the reel is rotated to bring one of the totalizers (on one of the shafts 396) to printing position the arcuate portion 783' (Fig. 23) will ride on the concentric periphery of ring 786 to hold shaft 376 against movement. It will also be noted that disc 773 is provided with an arcuate notch 783''. This permits stud 784 to revolve about shaft 376 as a center during resetting of the counter 380. As was viewed in Figs. 16 and 19, a small gear 787 is pinned to the left-hand end of shaft 761. This gear meshes with a gear segment 788 (Fig. 29) at the forward end of an arm 1080 journalled on a rod 1081 supported between transmission support plates 265 and 1014 (for location of plates see Fig. 2). Segment 788 meshes with a gear 1081 fixed to shaft 1012 which supports the consecutive number counter wheels 1060 (Fig. 38) associated with the check and slip printing mechanism.

It is understood that the consecutive counter provided in the reel corresponds at all times with the consecutive counter associated with the check issuing mechanism. Thus it is clear that when consecutive counter 380 (Fig. 10) is reset to zero, the counter wheels 1060 associated with the check and slip mechanism (Fig. 38) will also be reset to zero.

In the illustrated machine when it is desired to reset the consecutive counter the control lever 180 is moved to Reset consecutive counter position (Figs. 31 and 32), the uppermost position thereof, with the result that the cam portion 789 of cam member 745 shown in Fig. 14, will rock three-arm lever 744 in a clockwise direction as viewed in Fig. 14, thereby bringing pinion 742 (Fig. 31) into engagement with gears 738 and 739 (Fig. 3). Now, in order to release the machine for operation it is simply necessary to depress the No sale key and a Clerk's key and the motor bar with the result that the machine will operate to first effect a printing from the consecutive counter 380 and then reset the same to zero.

It is not necessary to disengage the transmission line from the actuating gears of the reel for this operation as is the case when total taking and resetting of the totalizers and special counters associated therewith is to be effected, since it will be remembered that the consecutive counter 380 (Fig. 10) on shaft 376 (Figs. 23 and 24) is reset without effecting any axial movement of said shaft, stud 784 provided on plate 783 being long enough to permit gear 759 (Figs. 16 and 19) to move axially without disengaging it from slot 785 (Fig. 21) provided in gear 759.

From the description of the above parts it is clear that when a Sub-total is taken, gear 742 (Fig. 31) is not moved into engagement with gears 738 and 739 (Fig. 3) and thus only printing will be effected from the selected totalizer. However, when the control lever is moved to Grand-total position, pinion 742 will be moved into engagement with gears 738 and 739 with the result that the resetting gears will be caused to operate and consequently the totalizer and the special counter associated therewith will be reset to zero after printing has been effected therefrom. This mechanism, it is clear, is so constructed that each of the totalizers and associated special counters may be printed from and reset by successively bringing them to printing position, and then releasing the machine for operation. This procedure is repeated until a printing impression had been taken from all of the totalizers and counters of the reel. Resetting of the No sale counter is effected in the same manner as are the totalizers. The shaft supporting this counter also, is provided with a clutch 776, such as shown in Fig. 19, which engages in the clutch portion 777 of gear 759. Thus, when the No sale counter is brought to printing position, printing from and resetting thereof will occur in the manner just described.

In order to prevent movement of the reel during a total taking operation of the machine or to prevent operation of the machine when a totalizer has not been properly brought to printing position the following mechanism is provided. As shown in Figs. 14, 15, and 22, it is seen that a bell crank lever 790 is pivoted on a stud 791 provided on the inner side of frame 13. The substantially horizontal arm 792 thereof is provided with a nose portion 793 which is adapted to engage in any one of a plurality of notches 794 provided in a disc 795 fixed to sleeve 802. Fixed to shaft 145, (Fig. 14) which shaft it will be remembered has pinned thereto the arm 30 (Figs. 3 and 7) associated with the motor switch control mechanism, is a substantially horizontal arm 796. Bell crank lever 790 is provided with a depending arm 798 which is adapted to move into engagement with arm 796 (Fig. 14).

From this construction it is obvious that when the reel is rotated and the nose portion 793 of arm 792 rests upon the high portion between the notches of disc 795, bell crank lever 790 will be rocked in a clockwise direction as viewed in Fig. 14 thereby bringing the lower end of arm 798 over arm 796 and thus preventing shaft 145 from rocking in a counter clockwise direction to release the motor switch control mechanism. It also follows that when the machine is released for operation, shaft 145 will be rocked in a counter clockwise direction which will bring the end of arm 796 into engagement with the left side of depending arm 798 thereby preventing rotation of the reel. This mechanism forms an effective interlock to insure against any misoperation of the associated parts.

*Control mechanism*

The illustrated machine is provided with a single lock control mechanism which enables the proprietor or other authorized person having a key thereto to condition the machine for its various modes of operation. As shown in Figs. 31 and 32, the control lever may be moved to seven different positions of adjustment. In its uppermost position, the control lever through its associated mechanism will condition the machine for printing from and resetting the consecutive number counter. When moved to the next position or Open drawer position, the machine may be operated regardless of whether the drawer is open or closed.

The next position in order is the Closed drawer position. When the control lever is in this position the machine is locked against operation when the drawer is open and is not released until the drawer has been fully closed. The next position in order is the Unlock clerks' keys position. When the control lever is in this position the plate supporting the individual locks for the Clerks' keys may be shifted so that the Clerks' keys may be operated in the usual manner without first releasing them from their individual locks. The control lever must then be moved to either Open drawer or Closed drawer position to condition the machine for operation.

The next position in order is the Lock register position, in which position all of the keys are locked against operation.

The next positions in order are the Sub-total and Grand total positions, respectively. When the control lever is moved to Sub-total position, the keys are locked against operation but the machine may be operated to effect printing, after the reel has been rotated to bring one of the totalizers to printing position, by simply depressing the motor bar. When the control lever is moved to Grand total position, the resetting mechanism is conditioned for operation so that after a total is printed from the selected totalizer, it will be reset to zero by the resetting mechanism. The mechanisms associated with the control lever for conditioning the machine for the various modes of operation relating to the structures described in this divisional case will now be described in detail.

Referring particularly to Figs. 27, 29, and 31, when the control lever 180 is moved to Reset consecutive counter position, cam 650' (Fig. 29) provided therein will rock gear segment 652' in a counterclockwise direction about its pivot 653 to the position shown in this figure. Gear segment 652' meshes with a gear 655 fixed to control shaft 185 and thus the latter will be moved slightly in a clockwise direction with the result that the cam portion 789 (Fig. 14) of slot 746 provided in disc 745, which it will be remembered is also fixed to shaft 185, will rock the three-arm lever 744 in a clockwise direction bringing pinion 742 (Fig. 31) into engagement with gears 738 and 739 (Fig. 3), thereby conditioning the resetting mechanism for operation.

It will also be remembered that cam plate 186 (Fig. 31) which is provided with the notches 187a, 187b, 187c, 189a, and 189b is also fixed to shaft 185. Thus, when the control lever is moved to Reset consecutive counter position, the first notch 187a provided in plate 186 will register with stud 190 on pitman 181. Now, upon depression of the No sale key, a Clerk's key, and the motor bar 43, the motor switch will be tripped and the machine will be operated. When the motor bar is depressed, stud 126 (Fig. 7) carried by plate 127 will rock shaft 123 in a counterclockwise direction, as viewed in Figs. 7 and 8. Stud 126 will also release latch 138 from engagement with the depending arm 136 fixed to shaft 137, thereby permitting shaft 137 to rock in a counterclockwise direction by the action of spring 147 (Fig. 7) on link 141 with the result that arm 30 will be rocked to release the motor switch control mechanism. When shaft 123 is rocked in this manner, pitman 181 (Fig. 31) will be elevated slightly, thereby bringing projection 190 thereon into notch 187a. If the notch is out of alignment with projection 190, it is clear that shaft 123 will be held against movement and the machine will thus be locked against operation.

When the control lever is moved to Reset consecutive counter position, as was pointed out before, pinion 742 (Fig. 3) is rocked into engagement with gears 738 and 739 which operate, respectively, the printing mechanism and the resetting mechanism.

From the foregoing it is seen that during an operation of the machine, when the control lever is so positioned, printing first will be effected from the consecutive counter mounted in the reel after which the resetting mechanism will become effective to reset both the consecutive counter mounted in the reel and also that associated with the check and slip printing mechanism.

As pointed out hereinbefore, the machine is provided with an Auditor's lock by which the Grand total printing and resetting are controlled.

The control lever is released for movement to various positions by means of a key inserted in a lock 893 (Fig. 27). An arcuate notched plate 887 is fixed to the inner side of the frame 11 (Fig. 22). The lock 893 is provided with a tubular bolt 892, having a locking portion 894 which is normally adapted to register with a series of notches 887' formed in plate 887. There is one notch 887' for each position of the control lever except the Unlock clerk's position and the Grand total position. Fixed to the plate 887 at the front thereof is a block 888.

The lock 893 is adapted to be operated in two different manners with two different keys.

One key, which may be given to the store manager, is capable of releasing the bolt so that the locking portion 894 may be moved to the right side of plate 887, as seen in Fig. 22, and this will allow the control lever 180 to be moved to all positions except the Grand total position. The lever 180 cannot be moved into this position at this time because the locking portion 894 of the bolt engages the block 888. The other key may be given to the auditor and this key will allow the locking portion of the bolt 894 to be moved to the left of plate 887, as seen in Fig. 22, and this will allow the control lever to be moved to any of its positions of adjustment, including the Grand total position, because there is no block 888 on the left-hand side of 887 as viewed in Fig. 22.

Details of the lock per se may be found in the parent case.

In order to locate the different positions of adjustment of the control lever 180 (Fig. 27) in respect to the plate 887, control lever 180 is provided with a spring detent 889. Detent 889 is adapted to register with the notches 889' provided in the under concentric portion of plate 887. There is one notch 889' for each of the positions of the control lever and by this means the manager or auditor can readily aline the locking portion 894 with the notches 887'.

Now, when the control lever is moved to Grand total position, by means of the auditor's key, shaft 185 will be given an additional rocking movement in a counterclockwise direction by the action of the cam portion provided at the lower end of slot 650' engaging stud 651' of segment 652' (Fig. 29). When shaft 185 is moved in this manner plate 186 (Fig. 31) will also be moved in the same direction to bring notch 189b into registering position with respect to projection 191 provided on pitman 181. During movement of the control lever from Sub-total to Grand total position shaft 660, however, will be held stationary since during this movement a second concentric portion 671c provided on cam edge 671 (Fig. 31) of control lever 180 will have moved into registering position with stud 672 of segment 674 (Fig. 27).

When shaft 185 is moved upon movement of the control lever from Sub-total to Grand total position, portion 746' (Fig. 14) of cam 746 will engage stud 747 on three-arm lever 744 thereby rocking the latter in a clockwise direction to engage pinion 742 (Fig. 3), with gears 738 and 739 to condition the resetting mechanism for operation. Now, when the reel is rotated to bring a totalizer to printing position and the motor release bar is depressed, a printing impression will be effected from the selected totalizer after which resetting thereof and of the special counter associated therewith will be effected by the resetting mechanism in the manner described hereinbefore.

Fig. 33 illustrates diagrammatically the relative movements of shafts 185 and 660 during movement of the control lever 180 to its various positions of adjustment. The heavy portion 880 illustrates the movement of the control lever from Reset consecutive counter position to Lock register position while the heavy portion 881 illustrates the movement thereof from Sub-total position to Grand total position. The heavy portion 882 associated with shaft 185 illustrates the angular movement of shaft 185 during movement of the control lever from Reset consecutive counter position, to Lock register position, while the heavy portion 883 shows the angular movement of shaft 185 during movement of control lever 180 from Sub-total to Grand total position. The radial line 884 connecting the heavy portions 882 and 883 illustrates the dwell in cam slot 650' (Fig. 27) during which time motion is transmitted to shaft 660 by cam 671. The light line 885, shown in Fig. 33, illustrates the movement of control lever 180 from Lock register position to Sub-total position and light portion 886, shown in connection with shaft 660, illustrates the angular movement of shaft 660 during movement of the control lever from Lock register position to Sub-total position which is a distance equal to substantially 270°.

Thus, it is clear that during movement of control lever 180 from Reset consecutive counter to Grand total position, shaft 185 is intermittently moved through an angle of substantially 90° while shaft 660 is moved through an angle of substantially 270°. During movement of the control lever from Lock register to Sub-total position, it is seen, is the only time at which motion is imparted to shaft 660.

A novel construction is shown in the machine for identifying the Sub or Grand totals which are printed upon the record strip. This identification protects the record to the extent that when the Grand total symbol is printed, it is a proof that the corresponding totalizer is reset to zero. This construction will now be described. Referring to Figs. 10, 16, 36, and 37, it will be noted that a disc 4501 is keyed to each totalizer shaft 396 and is positioned adjacent the aforementioned type disc 450 which, it was pointed out, is located adjacent each special counter associated with each totalizer.

As was seen in the description of the resetting mechanism, each shaft 396 is adapted to be moved axially to the left (Fig. 16) and is then rotated clockwise (Fig. 17). It will be remembered that this movement does not disturb the setting of the totalizer wheels. This movement of shaft 396 takes place in the present machine before the printing mechanism has effected an imprint of the total standing on the totalizer wheels.

Figure 36:
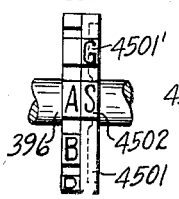
Figs. 36 and 37 show two views of the parts provided for printing an identifying character upon the record strip to distinguish grand-totals from sub-totals.
Figure 37:
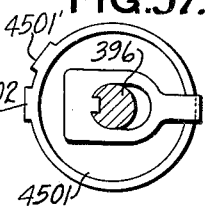

Therefore, it will be clear that if a type 4501', as shown in Figs. 36 and 37 is provided on the disc 4501, it will be moved around to printing position by the aforesaid movement of the shaft 396 and when the printing mechanism is subsequently operated this type will also appear adjacent the printed total. By keying the disc 4501 to the shaft 396 in the manner shown in Figs. 36 and 37 a relative movement between the disc 4501 and the shaft 396 is permitted to allow for the axial movement of said shaft. It will, of course, be understood that when no resetting of the totalizers takes place, such as in the Sub-total position of the control lever, the shaft 396 will remain stationary and thus the disc 4501 will not be moved.

To identify this sort of total the disc 4501 is provided with another raised character 4502 which is normally printed for identifying a Sub-total. This character in the present machine represents the letter S, as will be viewed in Figs. 36 and 37. The character designating a Grand total, as will also be viewed in the above figures, represents the letter G. Thus, by the above arrangement a positive means is provided to distinguish the totals so that the presence of the letter G adjacent to any printed total is proof that the corresponding totalizer has been reset to zero.

It will also be remembered that when the control lever is moved to Lock register position, the transmission line is still in normal position, but the cam shaft 430 (Figs. 11 and 12) provided in the reel, as well as the other moving parts therein, are locked against operation. The keys are also locked against operation. The shoulder 876 (Fig. 31) of three-arm lever 873 is still in alignment with projection 870 of pitman 181 and therefore the machine will not be released for operation upon depression of the motor bar.

However, if by any chance the machine were accidentally operated when the parts are in this position several of the locked parts would be damaged. In order to insure against any such mishaps, mechanism is provided which compels rotation of the reel to release the machine for operation when the parts have been adjusted to this position. To this end, as will be seen in Figs. 14 and 15, a bell crank lever 900 is provided. Bell crank lever 900 is pivoted on 791 and is provided with an upper arm 901 having a projecting portion 902 which is adapted to engage in a notch 903 of plate 904 which plate is fixed to notched disc 795. The lower arm 905 of bell crank lever 900 is formed with an ear 906 which is adapted to engage the outer edge of cam plate 745. Intermediate the pivot 791 and ear 906 arm 905 is provided with a shoulder 907 which is adapted to engage arm 796 which arm is fixed to shaft 145. A spring 908 urges bell crank lever 900 in a clockwise direction. The edge of cam plate 745 is so constructed that during movement of the control lever from Reset consecutive counter position to Unlock clerks' keys position, ear 906 will ride on the concentric portion of cam plate 745.

Upon movement of control lever 180 to Lock register position, however, the cutaway portion 909 of cam plate 745 will register with ear 906 and permit spring 908 to rock bell crank lever 900 in a clockwise direction bringing nose portion 902 into notch 903 of disc 904. At the same time, shoulder 907 provided on bell crank lever 900 will move over the end of lever 756 and thereby prevent rocking of shaft 145 to release the machine for operation. It will also be remembered that during movement of the control lever from Lock register position to Sub-total position shaft 185 carrying cam plate 745 will not be moved. Movement of the control lever to this position simply causes the transmission line to be swung out of normal position.

Thus, upon rotation of the reel to bring a selected totalizer to total printing position notch 903 of disc 904 will cam bell crank lever 900 in a counterclockwise direction removing the shoulder 907 thereof from engagement with arm 796. The nose portion 902 will then engage the concentric portion of disc 904 and ride thereon until the reel is restored to normal position, when the nose portion 902 will again be moved into notch 903 by spring 908.

This condition also exists when the control lever is moved to Grand total position, since it will be seen in Fig. 14, that the cutaway portion 909 extends to the end part of cam 745 which allows for the further movement of cam 745 when the control lever is moved from Sub-total to Grand total position. From the above it is clear that an effective interlocking mechanism is provided which prevents any misoperations of the machine by making it necessary to rotate the reel to properly position a totalizer into printing position before the machine can be released for operation.

While the form of mechanism herein shown and described is admirably adapted to fulfill the objects primarily stated, it is to be understood that it is not intended to limit the invention to the one form or embodiment herein disclosed, for it is susceptible of embodiment in various forms, all coming within the scope of the claims which follow.

What is claimed is:

1. In a machine of the class described, the combination of a main operating mechanism, a totalizer, a reset mechanism including a shaft supporting said totalizer, and means for actuating said shaft driven by said main operating mechanism and comprising a pair of gears, one of said gears being movable axially to shift a totalizer shaft and also movable rotatably to rotate the totalizer elements to zero.

2. In a machine of the class described, the combination of a main operating mechanism, a totalizer comprising a plurality of rotatable elements, each of said elements having a pawl pivoted thereto, a shaft provided with a series of notches normally out of alignment with said pawls, means for first shifting said shaft to align said notches with said pawls, and means for then rotating said shaft to restore said totalizer elements to zero, said means for shifting and rotating said shaft comprising a pair of relatively movable gears, one of said gears being shiftable laterally to shift said shaft and then movable rotatably to rotate said shaft to restore said totalizer elements to normal and the other gear being movable rotatably to first shift said one gear laterally and to then rotate therewith.

3. In a machine of the class described, the combination of a reel; a plurality of totalizers mounted in said reel; a resetting mechanism including a reset shaft for each totalizer and a reset actuating mechanism; means for rotating said reel to bring each totalizer into alignment with said actuating mechanism; and a clutch mechanism provided on each totalizer shaft adapted to engage a clutch on said actuating mechanism when the totalizer is moved to resetting position, said actuating mechanism being effective to first shift said shaft of the totalizer so positioned and then rotate the same to restore the totalizer to zero.

4. In a machine of the class described, the combination of a pair of gears, one of said gears having fixed thereto a screw shaft which engages with an internal thread provided in the other gear; and a pair of segments for actuating said gears, said parts being so constructed and arranged, that one of said segments will rotate its related gear to rotate the same while the other of said segments engages its gear to lock the same against rotary movement thereby causing said second mentioned gear to move axially a predetermined distance when its segment will then rotate it in unison with said first mentioned gear.

5. In a machine of the class described, a totalizer comprising a plurality of rotatable totalizer elements; a pivotally mounted pawl supported on each of said elements; a reset shaft supporting said elements having a plurality of notches therein normally out of engagement with said pawls; and a clutch member fixed to said shaft and adapted to engage a clutch portion provided in a resetting actuating mechanism, said resetting actuating mechanism comprising a pair of gears one of which having connections for first moving the other gear axially to shift said shaft to align said notches with said pawls and then to rotate with the other gear to restore said totalizer elements to normal.

6. In a machine of the class described, the combination of a main operating mechanism, a totalizer reel, a plurality of totalizers mounted therein, reset mechanism including a reset shaft for each totalizer, a clutch member fixed to the end of each shaft, and an actuating means, and means for rotating said reel to successively engage each of said clutch members with said actuating means, said actuating means upon operation of the machine, first shifting said shaft and then rotating the same to restore the totalizer and counter to zero.

7. In a machine of the class described, the combination of a main operating mechanism; a reel; a plurality of totalizers mounted in said reel; a resetting mechanism including a reset shaft for each totalizer, an actuating mechanism, and means provided on each shaft operable to engage an element of said actuating mechanism when said reel is rotated to position a totalizer for a resetting operation, said actuating mechanism being operated upon an operation of the machine to restore the totalizer so positioned to zero.

8. In a machine of the class described, the combination of a main operating mechanism, a normally inoperative resetting mechanism, a control member, and means operated by said control member when moved to two of its positions of adjustment for conditioning said resetting mechanism for operation by said main operating mechanism.

9. In a machine of the class described, the combination of a totalizer reel, a plurality of totalizers mounted in said reel, a resetting mechanism including a shaft for each totalizer and a normally inoperative actuating mechanism, a control member, means operated by said control member for conditioning said actuating mechanism for operation, means for rotating said reel to successively position each totalizer into operative relationship with respect to said resetting mechanism, and means for operating said actuating mechanism.

10. In a machine of the class described, a normally inoperative resetting actuating mechanism; a special counter; a reset shaft supporting said counter; connections on said shaft normally engaging said resetting actuating mechanism; a second counter remotely located from said first mentioned counter; connections from said resetting actuating mechanism to said second mentioned counter; a transmission line; supporting means therefor; said second mentioned connections being mounted in the supporting means for said transmission line; a control member; means operated by said control member for conditioning said resetting actuating mechanism for operation; a main operating mechanism; means for releasing said main operating mechanism for operation to cause simultaneous resetting of said counters; and means operated by movement of said control member to one position for moving said transmission line out of normal position thereby disabling the connections between said second mentioned counter and said resetting actuating mechanism.

11. In a machine of the class described, the combination of a main operating mechanism; a rotatable totalizer reel; a plurality of totalizers mounted in said reel for movement therewith; resetting mechanism including a normally inoperative actuating means, a shaft supporting each of said totalizers, a flanged clutch member fixed to each of said shafts, and means associated with the actuating means for engaging the clutch members on the totalizer shafts when the totalizers are brought to resetting position opposite the actuating means; a disc normally engaging the flange on said members to prevent longitudinal movement of said totalizer shafts; means provided in said disc, in alignment with said actuating means, to free the totalizer shafts for longitudinal movement when they are in engagement with the actuating means; means for rotating said reel to bring said totalizers successively into resetting position; and means to couple the actuating means to the main operating means for operation thereby.

12. In a machine of the class described, a plurality of totalizer elements; and reset mechanism including a spring-urged pawl pivoted to each element, a shaft supporting said totalizer elements and having a series of notches provided therein normally out of alignment with said pawls, one for each pawl, a flanged clutch member fixed to said shaft and operable to engage a corresponding clutch member provided in an actuating mechanism, said actuating mechanism comprising a pair of interconnected gears, and means for actuating said gears so as to cause one of the gears to rotate about its pivot to cause the other gear to first move axially to shift said shaft to align said notches with said pawls and then to cause both of said gears to rotate together to rotate said shaft to restore said totalizer elements to zero.

CHARLES W. GREEN.